(12) United States Patent
Chidambaram

(10) Patent No.: US 8,599,853 B2
(45) Date of Patent: Dec. 3, 2013

(54) SYSTEM AND METHOD FOR AN EXACT MATCH SEARCH USING POINTER BASED PIPELINED MULTIBIT TRIE TRAVERSAL TECHNIQUE

(75) Inventor: Madhusudan Chidambaram, Bangalore (IN)

(73) Assignee: Wipro Limited, Bangalore (IN)

( * ) Notice: Subject to any disclaimer, the term of this patent is extended or adjusted under 35 U.S.C. 154(b) by 327 days.

(21) Appl. No.: 12/761,420

(22) Filed: Apr. 16, 2010

(65) Prior Publication Data

US 2011/0255544 A1  Oct. 20, 2011

(51) Int. Cl.
 *H04L 12/56* (2011.01)
(52) U.S. Cl.
 CPC .................................. *H04L 45/745* (2013.01)
 USPC ..................................... 370/392; 370/395.32
(58) Field of Classification Search
 None
 See application file for complete search history.

(56) References Cited

U.S. PATENT DOCUMENTS

| | | | |
|---|---|---|---|
| 5,032,987 A | 7/1991 | Broder et al. | |
| 5,450,351 A | 9/1995 | Heddes | |
| 5,914,938 A | 6/1999 | Brady et al. | |
| 6,034,958 A | 3/2000 | Wicklund | |
| 6,590,898 B1 * | 7/2003 | Uzun | 370/401 |
| 6,606,681 B1 | 8/2003 | Uzun | |
| 6,675,163 B1 | 1/2004 | Bass et al. | |
| 6,691,171 B1 * | 2/2004 | Liao | 709/245 |
| 6,798,777 B1 * | 9/2004 | Ferguson et al. | 370/392 |
| 6,804,230 B1 * | 10/2004 | Jennings et al. | 370/388 |
| 6,859,455 B1 * | 2/2005 | Yazdani et al. | 370/392 |
| 7,043,494 B1 | 5/2006 | Joshi et al. | |
| 7,054,994 B2 | 5/2006 | Kastoriano et al. | |
| 7,111,071 B1 * | 9/2006 | Hooper | 709/238 |
| 2002/0146009 A1 * | 10/2002 | Gupta et al. | 370/392 |
| 2004/0013113 A1 * | 1/2004 | Singh et al. | 370/389 |
| 2004/0105442 A1 * | 6/2004 | Ko et al. | 370/392 |
| 2004/0114587 A1 * | 6/2004 | Huang et al. | 370/389 |
| 2008/0209121 A1 | 8/2008 | Cooke | |
| 2009/0097654 A1 | 4/2009 | Blake | |
| 2009/0327316 A1 * | 12/2009 | Sahni et al. | 707/100 |
| 2010/0199066 A1 * | 8/2010 | Artan et al. | 711/216 |
| 2010/0316051 A1 * | 12/2010 | Song et al. | 370/392 |
| 2011/0128960 A1 * | 6/2011 | Bando et al. | 370/392 |
| 2012/0257506 A1 * | 10/2012 | Bazlamacci et al. | 370/235 |

OTHER PUBLICATIONS

Baboescu, F., et al., "A Tree Based Router Search Engine Architecture With Single Port Memories", ACM SIGARCH Computer Architectures News, May 2005, vol. 33. pp. 1-11.

(Continued)

*Primary Examiner* — Timothy J Weidner
(74) *Attorney, Agent, or Firm* — LeClairRyan, a Professional Corporation

(57) ABSTRACT

A method and system for finding an exact match for an N-bit wide address. A system for finding an exact match for an N-bit wide address in every clock cycle includes a label extraction module and one or more pipeline blocks. The label extraction module extracts K bits from the N-bit wide address. The extracted K bits are used by pipeline block 1 as a key to directly lookup a base node of multibit trie. The base node is included in first lookup table (LUT) and first LUT is configured to store pointers to leaf nodes of multibit trie. A pipeline block 2 searches a current LUT for match on next Q bits of remaining (N–K) bits to retrieve a current pointer. Then, pipeline block (N–K)/Q finds the exact match by retrieving a unique search index matching remaining (N–K) bits when the current pointer is not empty.

21 Claims, 18 Drawing Sheets

(56) References Cited

OTHER PUBLICATIONS

Mehrotra P., "Memory Intensive Architectures for DSP and Data Communications", Department of Electrical and Computer Engineering, 2002, pp. 1-137.

Nilsson S., et al., "IP-Address Lookup Using LC-Tries", Department of Computer Science, Jul. 2, 1998, pp. 1-17.

Pagiamtzis, K., et al., "Content-Addressable Memory (CAM) Circuits and Architectures: A Tutorial and Survey", IEEE Journal of Solid-State Circuits, Mar. 2006, vol. 41, No. 3, pp. 712-727.

Ruiz-Sanchez, M., et al., "Survey and Taxonomy of IP Address Lookup Algorithms", IEE Network, Jan. 15, 2001, vol. 15, No. 2, pp. 1-29.

Srinivasan V., et al., "Faster IP Lookups using Controlled Prefix Expansion", Department of Computer Science, Washing University at St. Louis, Jun. 1998, pp. 1-10.

Brelet J., et al., "Using Virtex-II Block RAM for High Performance Read/Write CAMs", XILINX, Application Note: Virtex-II Series, Feb. 27, 2002, pp. 1-12.

Morrison, D., "PATRICIA—Practical Algorithm to Retrieve Information Coded in Alphanumeric", Journal of the Associate for Computing Machinery, vol. 15, No. 4, Oct. 1968, pp. 514-534.

Chao, J., et al., "High Performance Switches and Routers", John Wiley & Sons, Inc, 2007 chapter 2, pp. 25-76.

* cited by examiner

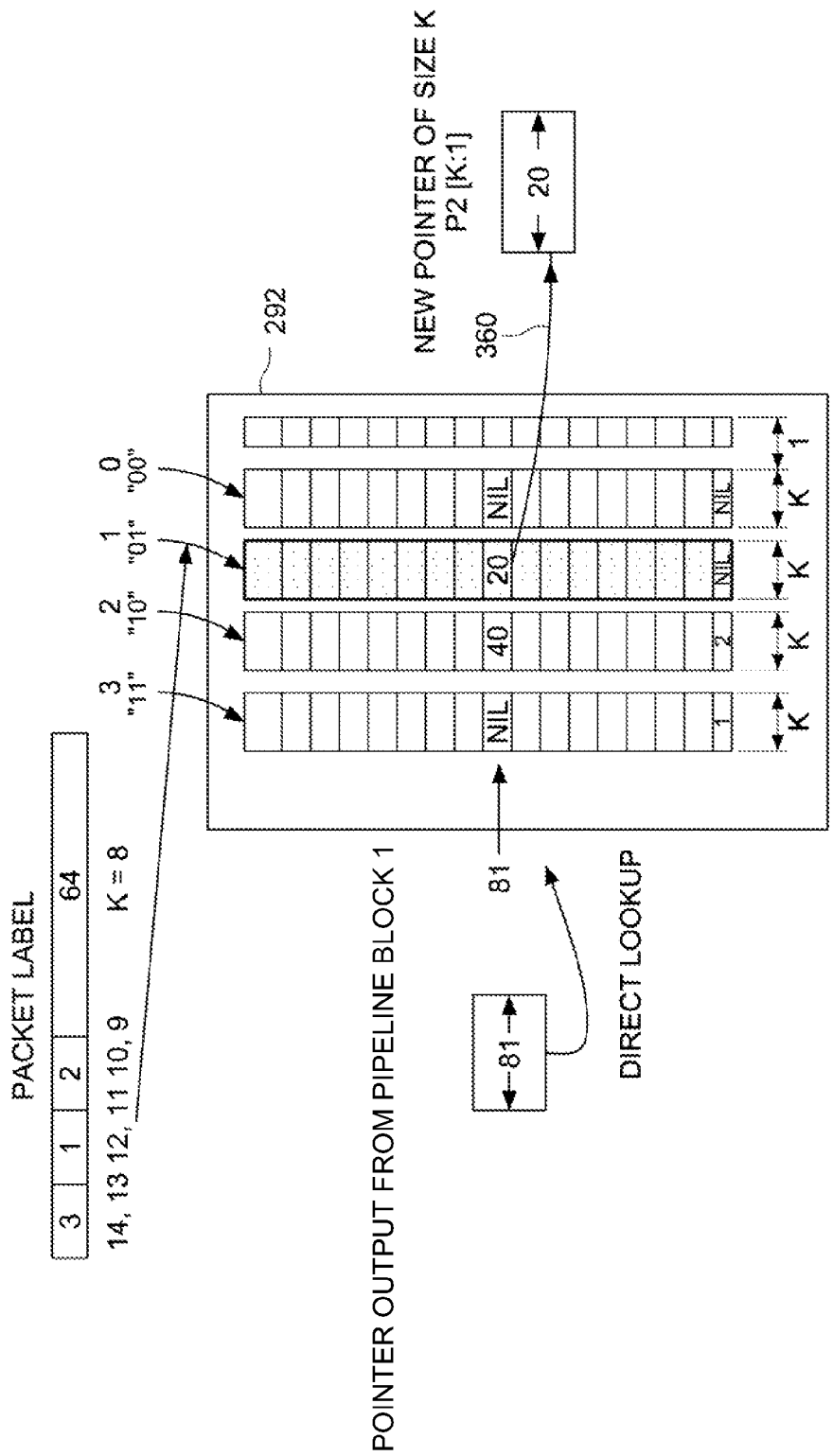

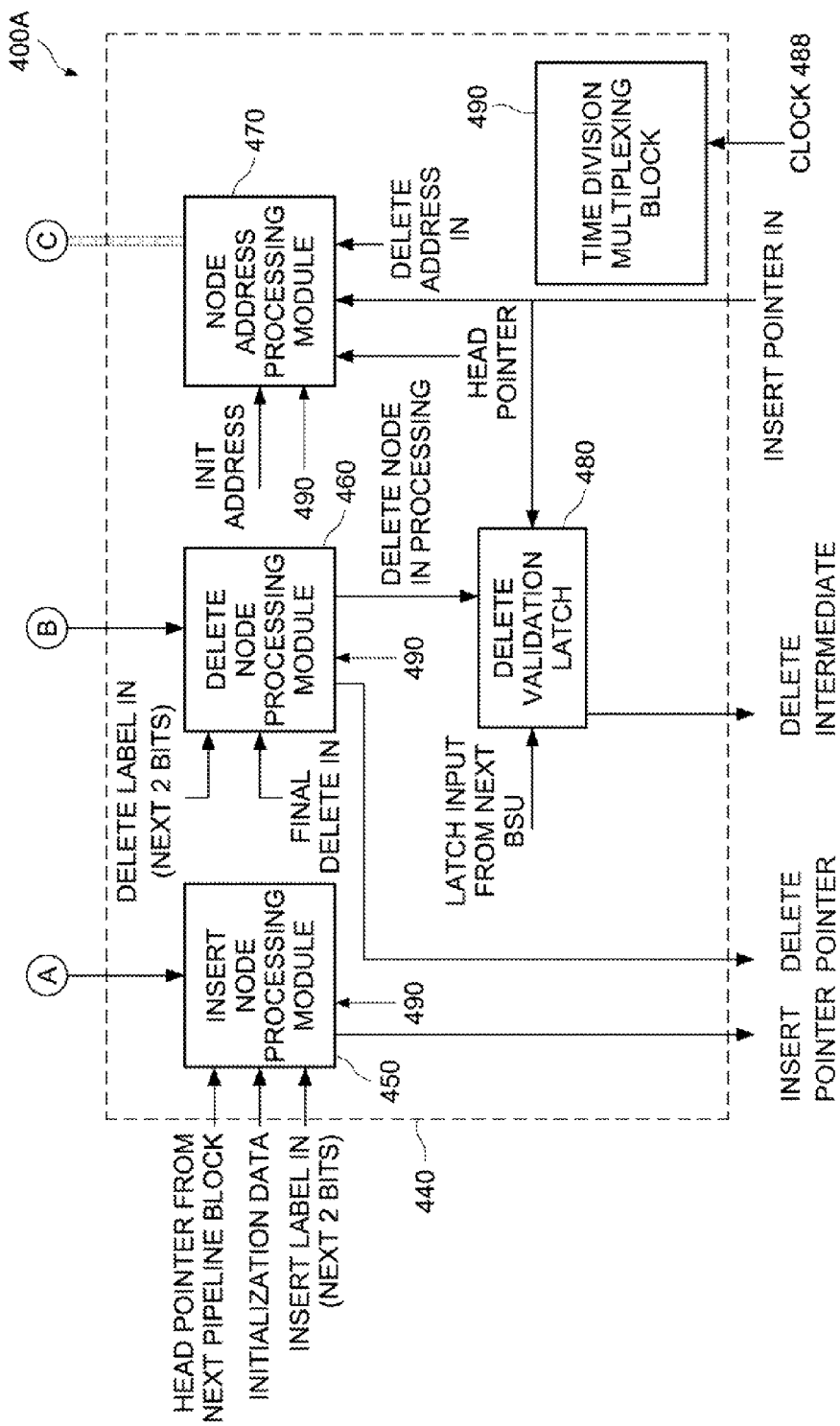
FIG. 4A (Contd.)

SYSTEM AND METHOD FOR AN EXACT MATCH SEARCH USING POINTER BASED PIPELINED MULTIBIT TRIE TRAVERSAL TECHNIQUE

BACKGROUND

Internet traffic is increasing dramatically with increased demand for bandwidth intensive IT applications such as streaming video, on-line gaming, video over internet protocol (IP), and others. In an Internet communication environment, the primary role of a router (or a switch) is to direct communication packets received from a source towards their final destination. In a typical router or a switch, communication packets from one port may be switched to another port based on information extracted from the incoming communication packet. To accomplish this, the router must decide for each incoming communication packet where to send it next. As a result, routers and switches configured to handle communication packets may be required to perform fast lookup of tables or databases at wire-speed based on a destination label in the incoming communication packet. For example, in a worst case scenario for a 40G Ethernet traffic rate, there may be approximately 62.5 million packets transaction per second and for a 100G Ethernet traffic rate, there may be approximately 156 million packets transaction per second.

Delays and inefficiencies in looking up labels/information from an incoming communication packet may lead to excessive queuing of the communication packets and may eventually lead to the router becoming a network bottleneck. Many routers today may find it challenging to scale to compute requirements to achieve lookup throughput in the order of 100-200 million searches per second. Adding to the challenge are factors such as, variable width of the lookup label and the variable size of the lookup database, which may vary depending on the application.

BRIEF DESCRIPTION OF THE DRAWINGS

Various preferred embodiments are described herein with reference to the drawings, wherein:

FIGS. 3A through 3F illustrate a simplified operation of the search engine to process an exemplary 14-bit wide network address label using an 8-bit direct LUT and a 2-bit trie in a particular application, according to one embodiment.

The drawings described herein are for illustration purposes only and are not intended to limit the scope of the present disclosure in any way.

DETAILED DESCRIPTION

A system and method for an exact match search using pointer based pipelined multibit trie traversal technique is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
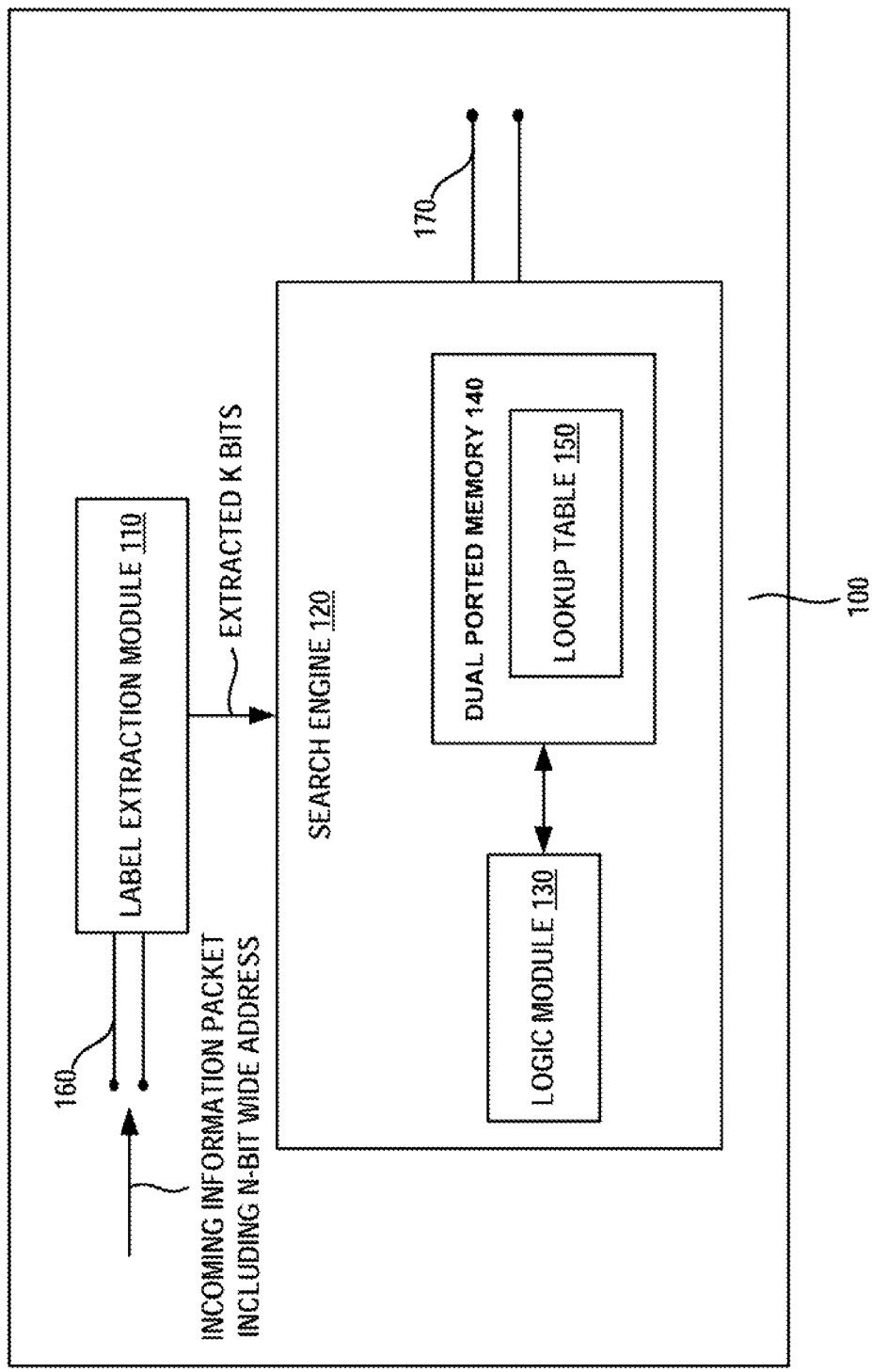
FIG. 1 illustrates a communication system for processing incoming information packets, according to one embodiment.

FIG. 1 illustrates a communication system 100 for processing incoming information packets, according to one embodiment. As shown in FIG. 1, the communication system 100 includes a label extraction module 110 and a search engine 120. The search engine 120 includes a logic module 130 and a dual ported memory 140 storing a lookup table (LUT) 150. The label extraction module 110 receives incoming information packets through one or more ingress (or input) ports 160. As shown, the label extraction module 110 receives an incoming information packet including an N-bit wide address. The label extraction module 110 extracts K bits of the N-bit wide address and directs the extracted K bits to the search engine 120. In one embodiment, the extracted K bits are used to directly lookup the LUT 150 in the dual ported memory 140 for finding an exact match of the incoming information packet, where K is dependent on a number of entries in the LUT 150. The search engine 120 outputs a pointer where information related to the extracted k bits is stored in the LUT 150. For example, the search engine 120 outputs the pointer through one or more egress ports 170.

The search engine 120 may be also configured to perform other digital signal processing functions such as: a) destination address lookup from a LUT 150 stored in the dual ported memory 140 to find a destination port, b) source address lookup from the LUT 150 to maintain a 'live' status for a previous LUT entry, and c) update a source or destination address in the LUT 150. Additional details of the search engine 120 are described with reference to FIGS. 2A and 2B. The logic module 130 may be configured to perform additional digital processing functions such as reading (or searching or looking up) and writing an address, inserting or deleting an address, comparing contents of two registers or memory locations, generating clock cycles, and others. The update of an address in the LUT 150 may include an insert operation if an address does not exist in the LUT 150 or a delete operation if an existing address fails to maintain a 'live' status.

A source or destination address as described herein may include a destination IPv4/IPv6 address, Ethernet MAC addresses, VLAN (Virtual LAN) identification number, MPLS (Multi Protocol Label Switching) label, ATM (Asynchronous Transfer Mode) label, VPI (Virtual Path Identifier)/VCI (Virtual Channel Identifier), and others or a combination thereof. The search engine 120 is scalable to adapt to processing various information packets having variable widths and having LUT databases of variable sizes. The width of the lookup address label, e.g., 48-bit wide or 128-bit wide, and the size of the LUT (which is determined by a number of entries stored in the LUT 150) may vary depending on the application.

Figure 2A:
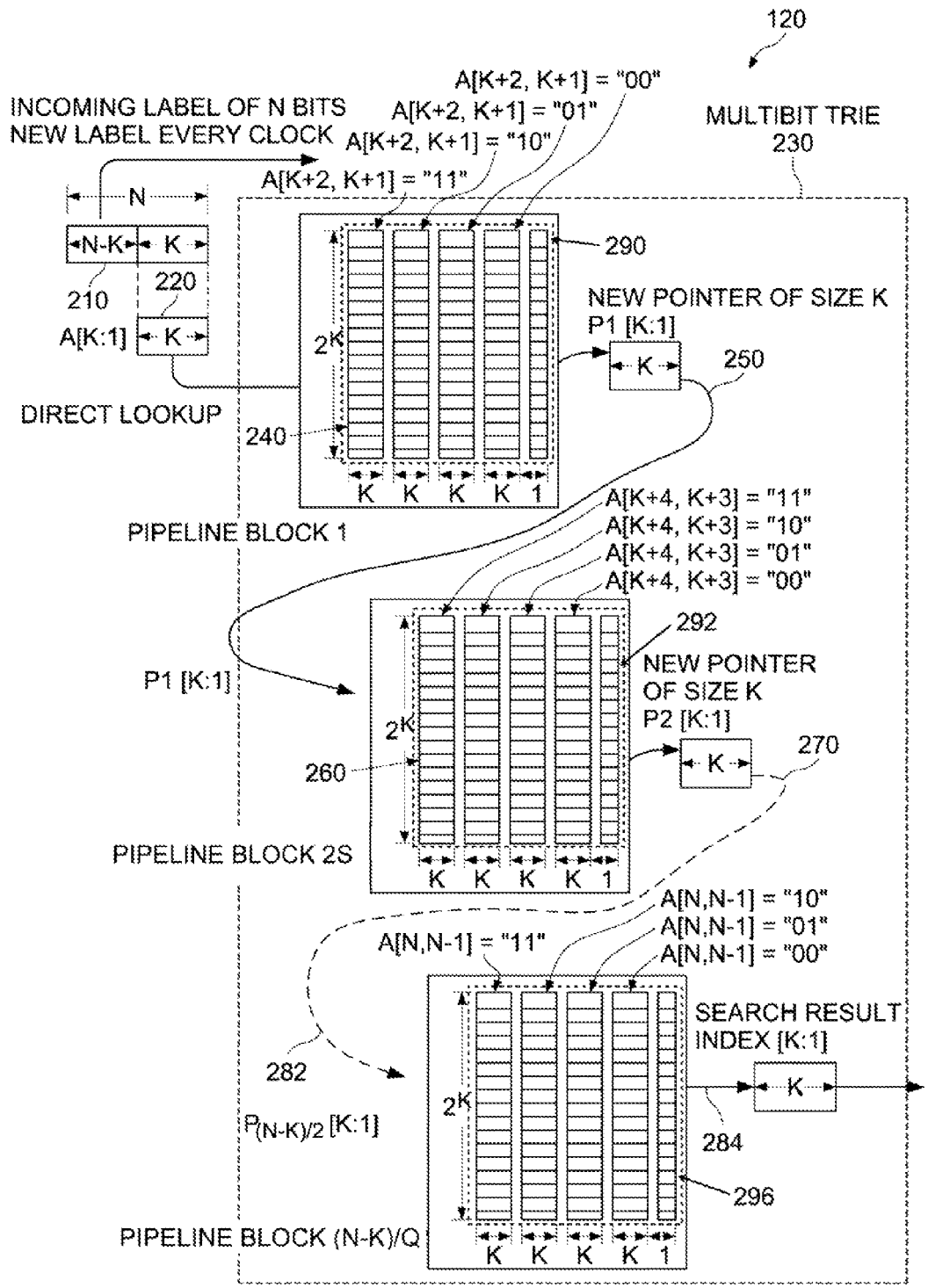
FIG. 2A illustrates a search engine described with reference to FIG. 1 including pipeline blocks, according to one embodiment.

FIG. 2A illustrates the search engine 120 described with reference to FIG. 1 including pipeline blocks, according to one embodiment. The search engine 120 deploys a combination of a direct lookup technique and a pointer based multibit trie traversal technique. Specifically, the direct look up technique is used for searching at least a portion of a network address label stored in a network table, e.g., the LUT 150, followed by deploying the pointer based multibit trie traversal technique for a remaining portion of the network address label to reduce the number of comparisons, to reduce memory size, and to improve search throughput for performing a search. FIG. 2 shows a multibit trie 230 for transversing in a pipelined manner. The term trie as described herein is a variant of a tree (or a directed acyclic graph) data structure that may be used for storing string data. Thus, a trie may be considered as an ordered data structure that stores information about contents of each node in a path from a root (or base) to the node. Each path between a parent node and a child node may represent a key.

The traversal of the trie starts at the root or base node. The traversal continues, from head to tail (or top level to lowest level), by taking one character at a time in a key string to determine the next state to go. The edge labeled with the same character is chosen to walk. Each step of such walking consumes one character from the key and descends one level lower in the trie. If the key is exhausted and a leaf node is reached, then one arrives at the exit for that key. If one cannot find a path past a node, either because there is no branch labeled with a current character in the key or because the key is exhausted at an internal node, then it implies that the key is not recognized or no matching entry is found by the trie traversal.

As shown in FIG. 2A, the search engine 120 includes the pipeline blocks (e.g., the pipeline block 1, one or more pipeline block 2s, the pipeline block (N−K)/Q, where Q is an integer not greater than (N−K)) used for searching an exact match of the incoming information packet including an N-bit wide address 210. According to an embodiment of the present invention, an exact match is found every clock cycle in the pointer based multibit trie transversal technique.

Figure 2B:
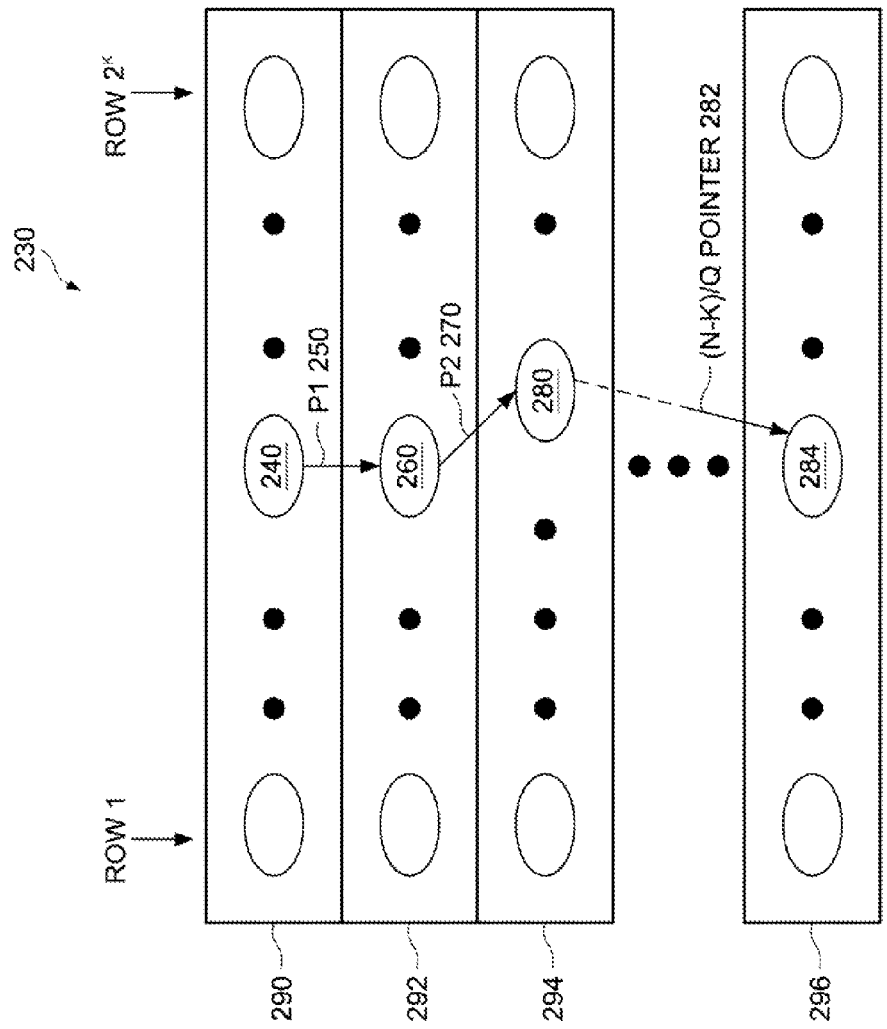
FIG. 2B illustrates a structure of a multibit trie described with reference to FIG. 2A, according to one embodiment.

FIG. 2B illustrates a structure of the multibit trie 230 described with reference to FIG. 2A, according to one embodiment. The multibit trie 230 includes a hierarchical arrangement of one or more nodes distributed across multiple levels. In an embodiment, a LUT is used to represent each node level of the multibit trie 230. Thus, a first LUT 290 includes information about nodes included at a base level of the multibit trie 230, a second LUT 292 includes information about nodes included at a first level of the multibit trie 230, a third LUT 294 includes information about nodes included at a second level of the multibit trie 230, and a last LUT 296 includes information about nodes included at the last level of the multibit trie 230. The nodes at various levels may be connected in a hierarchical manner as indicated by one or more pointers.

Referring to FIGS. 2A and 2B, a number of LUTs corresponds to a number of node levels of the multibit trie 230. A base node 240 corresponds to one row of the first LUT 290 having up to a maximum of $2^K$ number of entries, the row having a matching address defined by K bits 220. In an embodiment, K is configured to be equal to $\text{Log}_2 M$ bits, where M is the number of entries stored in the first LUT 290 for performing the lookup operation. If no matching base node is found, then the search engine 120 processes a next label received at a next clock cycle.

The first LUT 290 is configured to store pointers to leaf nodes (or lower level nodes relative to the base node or child nodes of the base node) of the multibit trie 230. In an embodiment, the first LUT 290 is configured to have M rows and $2^{Q+1}$ columns, where each of the $2^Q$ columns has a width of K bits and 1 column has a single bit width, where Q is an integer not greater than (N−K). In the depicted embodiment, value of Q is selected to be equal to 2. Thus, the first LUT 290 is configured to include $2^{2+1}=5$ columns.

In an embodiment, the last column having a width of 1-bit may be used to indicate if a node is a part of a linked list or part of the multibit trie 230. That is, the 1-bit column is used for maintaining a linked list when the node is not created and to host the leaf pointer when the node is created. This is possible since at any point in time, a pointer can be either part of the linked list or may be used as a node in the trie structure. This technique reduces additional memory which may have been needed to implement linked list, which is of width M×K per trie level, thereby resulting in total RAM bits saved to be equal to M×K−1×(N−K)/2 bits. The term linked list as described herein is a type of data structure that includes data records arranged in a sequence with each data record including a field that points to or is a reference to a next data record in the sequence.

The first Q=2 bits, e.g., K+2 and K+1 bits, of the remaining (N−K) bits of the N-bit wide address 210 are compared to determine if they match with a first column (e.g., matching '11'), a second column (e.g., matching '10'), a third column (e.g., matching '01') or a fourth column (e.g., matching '00') of the first LUT 290. If the K+2, K+1 bits match one of the four columns, then a pointer stored in the base node 240 and the matched column is retrieved and used as a first pointer P1 250 (having a width of K bits). The first pointer P1 250 points to a first level leaf node 260 of the multibit trie 230, the first level leaf node 260 being included in the second LUT 292. If no match is found for the K+2, K+1 bits and the row of the base node, the first pointer P1 250 is returned as empty.

As a next iterative step in traversing the multibit trie 230, subsequent Q=2 bits, e.g., K+4 and K+3 bits, of the remaining (N−K) bits of the N-bit wide address 210 are compared to determine if they match with a first column (e.g., matching '11'), a second column (e.g., matching '10'), a third column (e.g., matching '01') or a fourth column (e.g., matching '00') of the first level leaf node 260 included in the second LUT 292. If the K+4, K+3 bits match one of the four columns, then the first level leaf node 260 and the matched column are used to retrieve a second pointer P2 270 (having a width of K bits) pointing to a second level leaf node 280 of the multibit trie 230, the second level leaf node 270 being included in a third LUT 294. If no match is found for the K+4, K+3 bits and the row of the first level leaf node 260, the second pointer P2 270 is returned as empty.

As a last iterative step, the last Q=2 bits, e.g., (N and N−1 bits), of the remaining (N−K) bits of the N-bit wide address 210 are compared to determine if they match with a first column (e.g., matching '11'), a second column (e.g., matching '10'), a third column (e.g., matching '01') or a fourth column (e.g., matching '00') of a previous leaf node included in a LUT corresponding to a previous level, e.g., (N−K)/Q−1, of the multibit trie 230. In an embodiment, the first Q bits, the subsequent ones of Q bits, and the last ones of Q bits are consecutive bits having an increasingly significant bit order. If the N, N−1 bits match one of the four columns, then the (N−K)/Q pointer 282 stored in the previous leaf node and the matched column are retrieved and used as a unique search index 284 (having a width of K bits) for the N-bit wide address 210. If no match is found for the N, N−1 bits, then the (N−K)/Q pointer 282 is returned as empty.

In an embodiment, each node at a root, a base or a top level in the hierarchy may be configured to have at most $2^Q$ leaf nodes, e.g., four leaf nodes when Q=2, and each leaf node may be configured to have $2^Q$ leaf nodes at a lower level. There may be up to (N−K)/Q levels within the multibit trie 230. For a 2-bit trie, each node may have up to four children, e.g., nodes matching with '11', '10', '01', and '00' bit pattern. Each node may be configured to store pointers to leaf nodes (or lower level nodes relative to the root node or the base node) of the multibit trie 230. A null or an empty pointer may indicate 'no match' found.

The number of comparisons performed by the search engine 120 is reduced to one and latency is ((N−K)/Q)*L, where L is a memory latency factor that may be configured to have a value of one, N is the width of the entries (e.g., N may vary from 8 to 128 bits), K=⌈$\log_2$ M⌉, where M is the number of entries in a LUT and Q is an integer not greater than (N−K). Therefore, the number of comparisons performed for determining an address match is significantly reduced from M comparisons needed by Content Addressable Memories (CAM) type solution to a single comparison, thereby significantly improving search throughput and reducing power consumption. The search engine 120 deploys the pipelining technique that makes each 2-bit node as independent pipelines allowing one search to be completed every clock cycle (O(1)). Therefore, the number of clock cycles taken by a system based on a 2-bit traversal is reduced from O(log(N/2)) cycle for each search operation to one search every clock cycle.

FIGS. 3A through 3F illustrate a simplified operation of the search engine 120 to process an exemplary 14-bit wide network address label using an 8-bit direct LUT and a 2-bit trie in a particular application, according to one embodiment.

Figure 3A:
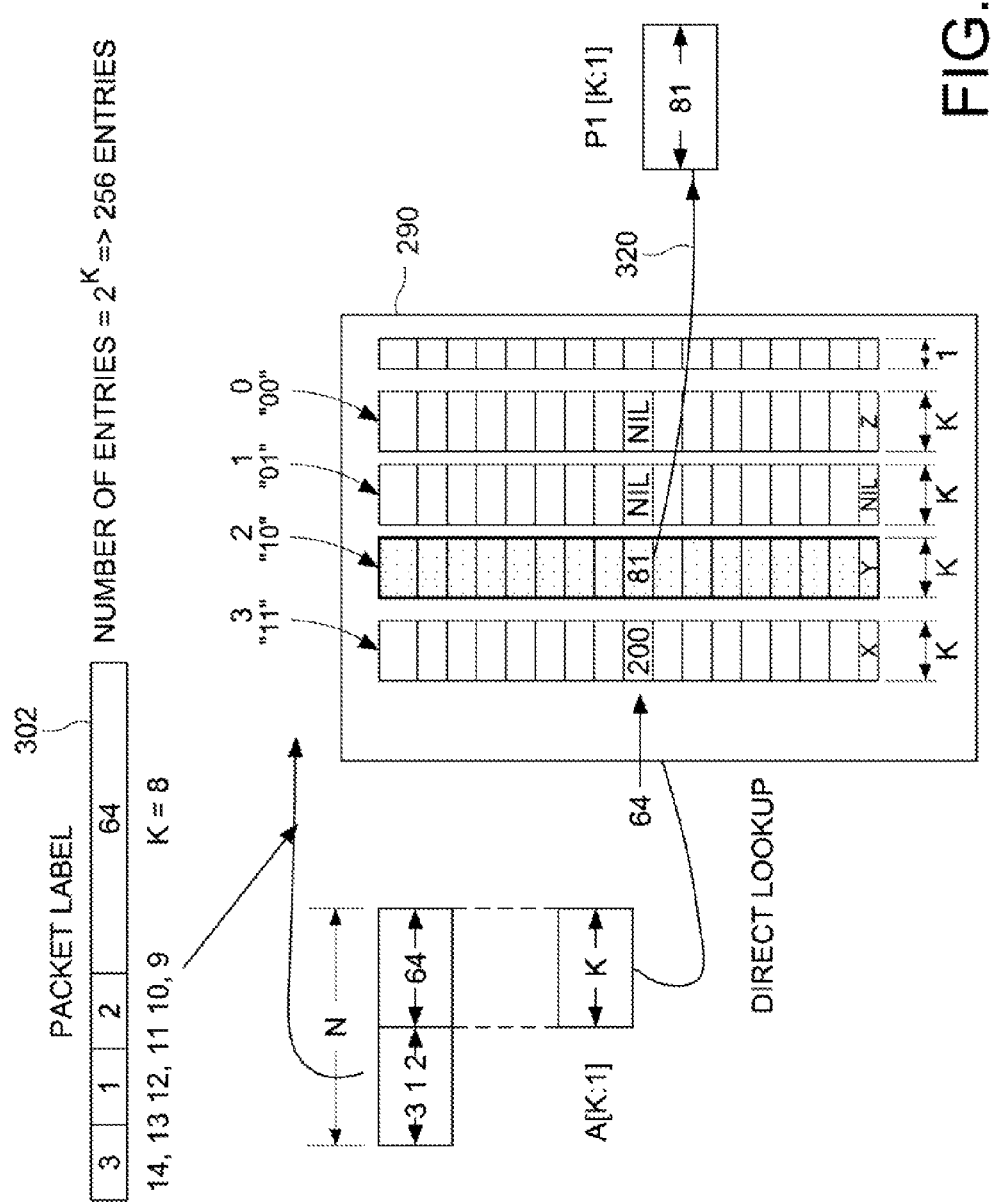
Figure 3B:
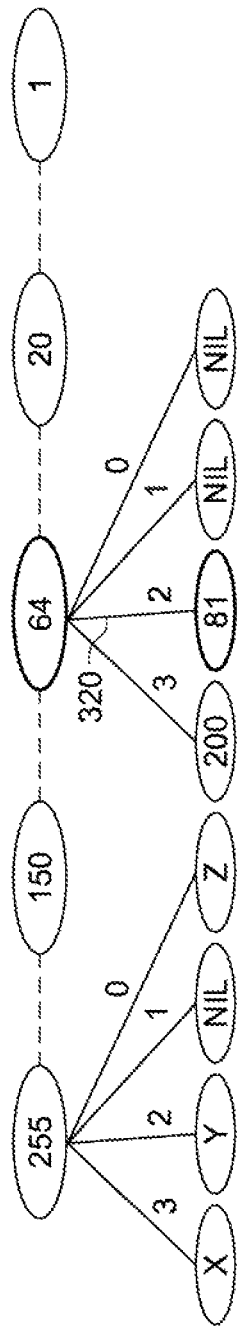

Particularly, FIG. 3A illustrates the pipeline block 1 of the search engine 120, according to one embodiment. FIG. 3B illustrates a node representation of the pipeline block 1 described with reference to FIG. 3A, according to one embodiment. Referring to FIGS. 3A and 3B, in the depicted embodiments, an incoming information packet address 302 is 14-bits wide (e.g., N=14), K=8 bits, and Q=2 bits. Therefore, a maximum number of entries in the first LUT 290 is $2^8$=256. Since (14−8)/2 is equal to three, number of iterations to match a 14-bit address using an 8-bit direct lookup is equal to three. The first LUT 290 has up to 256 rows starting with row 1 up to row 255. In the depicted embodiment, the value of K bits is equal to 64, [K+2, K+1] bits or $10^{th}$ and $9^{th}$ bits have a value of 2 or '10' bits, [K+4, K+3] bits or $12^{th}$ and $11^{th}$ bits have a value of 1 or '01' bits, and the last [N, N−1] bits or $14^{th}$ and $13^{th}$ bits have a value of 3 or '11' bits. A base node matching a value of 64 is located (by direct lookup of the first LUT 290 by using 64 as a key value). Then, a column of the first LUT 290 matching the $10^{th}$ and $9^{th}$ bits, e.g., column 2 having '10' bits, is selected. A first pointer P1 320 is retrieved from row=64, column=2 of the first LUT 290. The first pointer P1 320 points to a node of the second LUT 292, the node having a value of 81. The pointers stored in row=64, column=3 ('11' bits), row=64, column=1 ('01' bits) and row=64, column=0 ('00' bits) are not used.

Figure 3D:
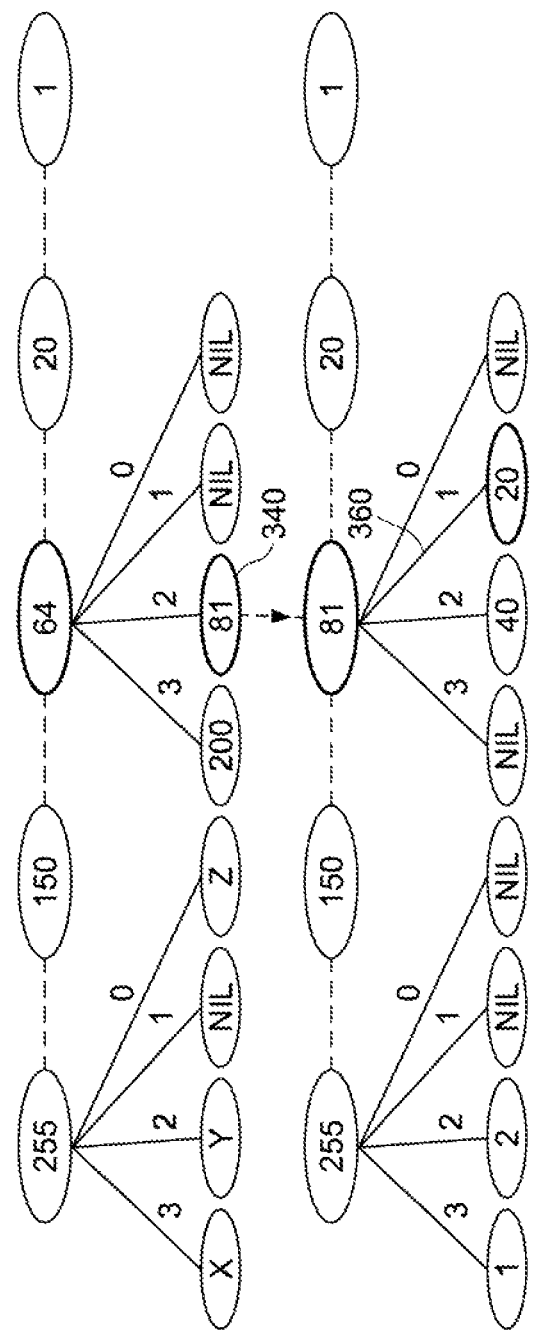

FIG. 3C illustrates one of the one or more pipeline blocks 2 of the search engine 120, according to one embodiment. FIG. 3D illustrates a node representation of the one of the one or more pipeline blocks 2 described with reference to FIG. 3C, according to one embodiment. Referring to FIGS. 3C and 3D, in the depicted embodiments, the second LUT 292 has up to 256 rows starting with row 1 up to row 255. In the depicted embodiment, a first level leaf node 340 having a value of 81 (obtained from the first pointer P1 320) is located in the second LUT 292 (by direct lookup of the second LUT 292 by using 81 as a key value). [K+4, K+3] bits or $12^{th}$ and $11^{th}$ bits have a value of 1 or '01' bits. A column of the second LUT 292 matching the $12^{th}$ and $11^{th}$ bits, e.g., column 1 having '01' bits, is selected. Then, a second pointer P2 360 is retrieved from row=81, column=1 of the second LUT 292. The second pointer P2 360 points to a node having a value of 20 in the third LUT 294. The pointers stored in row=81, column=3 ('11' bits), row=81, column=2 ('10' bits) and row=81, column=0 ('00' bits) are not used.

Figure 3E:
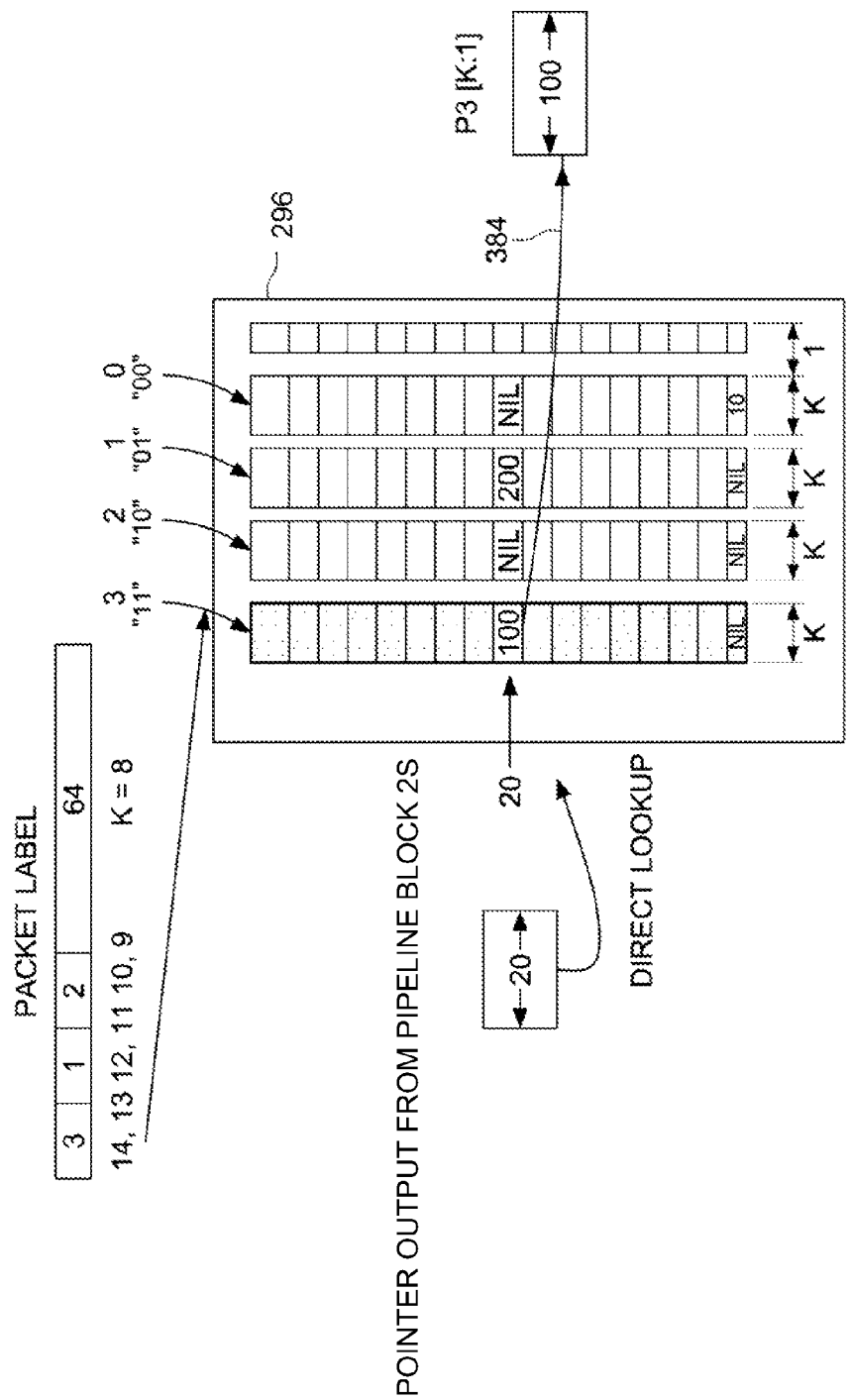
Figure 3F:
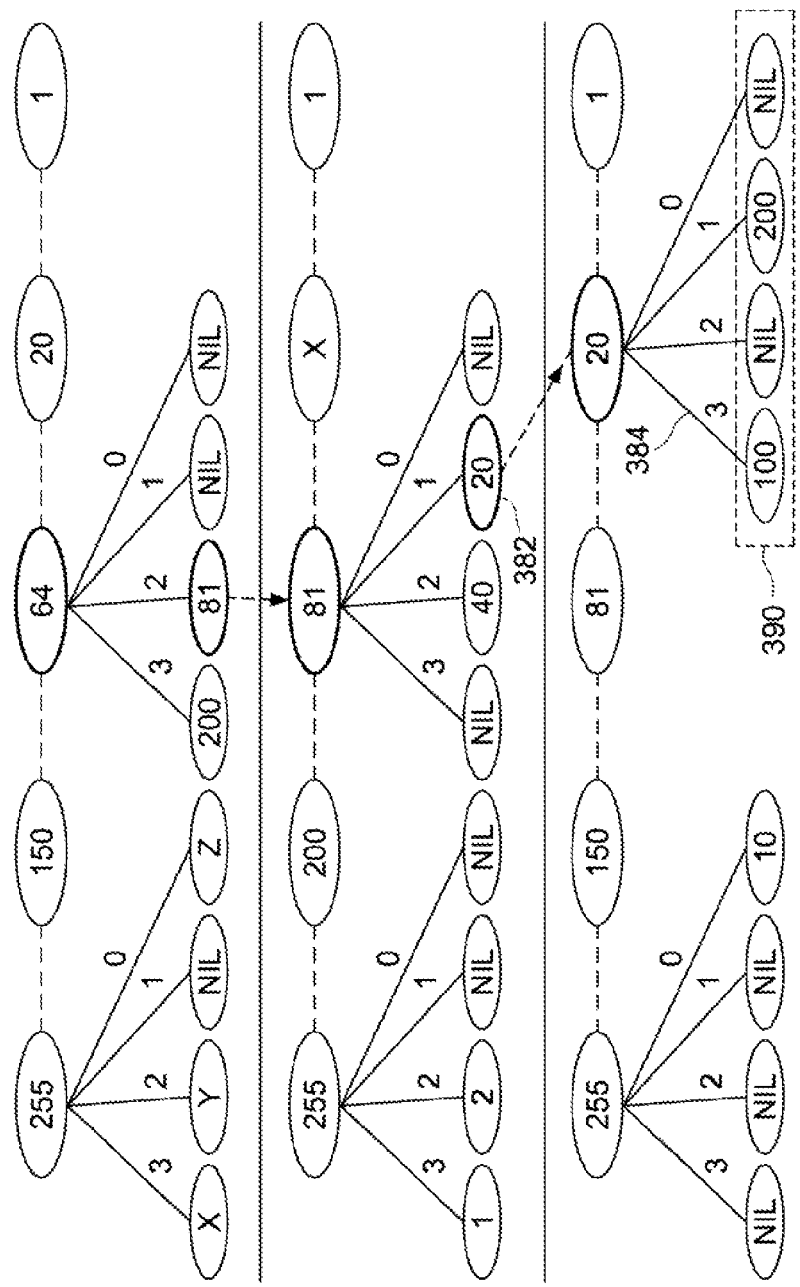

FIG. 3E illustrates the pipeline block (N−K)/Q of the search engine, according to one embodiment. FIG. 3F illustrates a node representation of the pipeline block (N−K)(N−K)/Q described with reference to FIG. 3E, according to one embodiment. Referring to FIGS. 3E and 3F, in the depicted embodiments, the third LUT 296 has up to 256 rows starting with row 1 up to row 255. In the depicted embodiment, a second level leaf node 382 having a value of 20 (obtained from the second pointer P2 360) is matched in the third LUT 296 (by direct lookup of the third LUT 296 by using 20 as a key value). [N, N−1] bits or $14^{th}$ and $13^{th}$ bits have a value of 3 or '11' bits. A column of the third LUT 296 matching the $14^{th}$ and $13^{th}$ bits, e.g., column 3 having '11' bits, is selected. Then, a unique search index pointer 384 is retrieved from row=20, column=3 ('11' bits) of the third LUT 296. The unique search index pointer 384 points to an address having a value of 100 in a fourth LUT 390 indicative of an exact match for the address 302. The pointers stored in row=20, column=2 ('10' bits), row=20, column=1 ('01' bits) and row=20, column=0 ('00' bits) are not used. A null or an empty pointer may indicate 'no match' found.

Figure 4A:
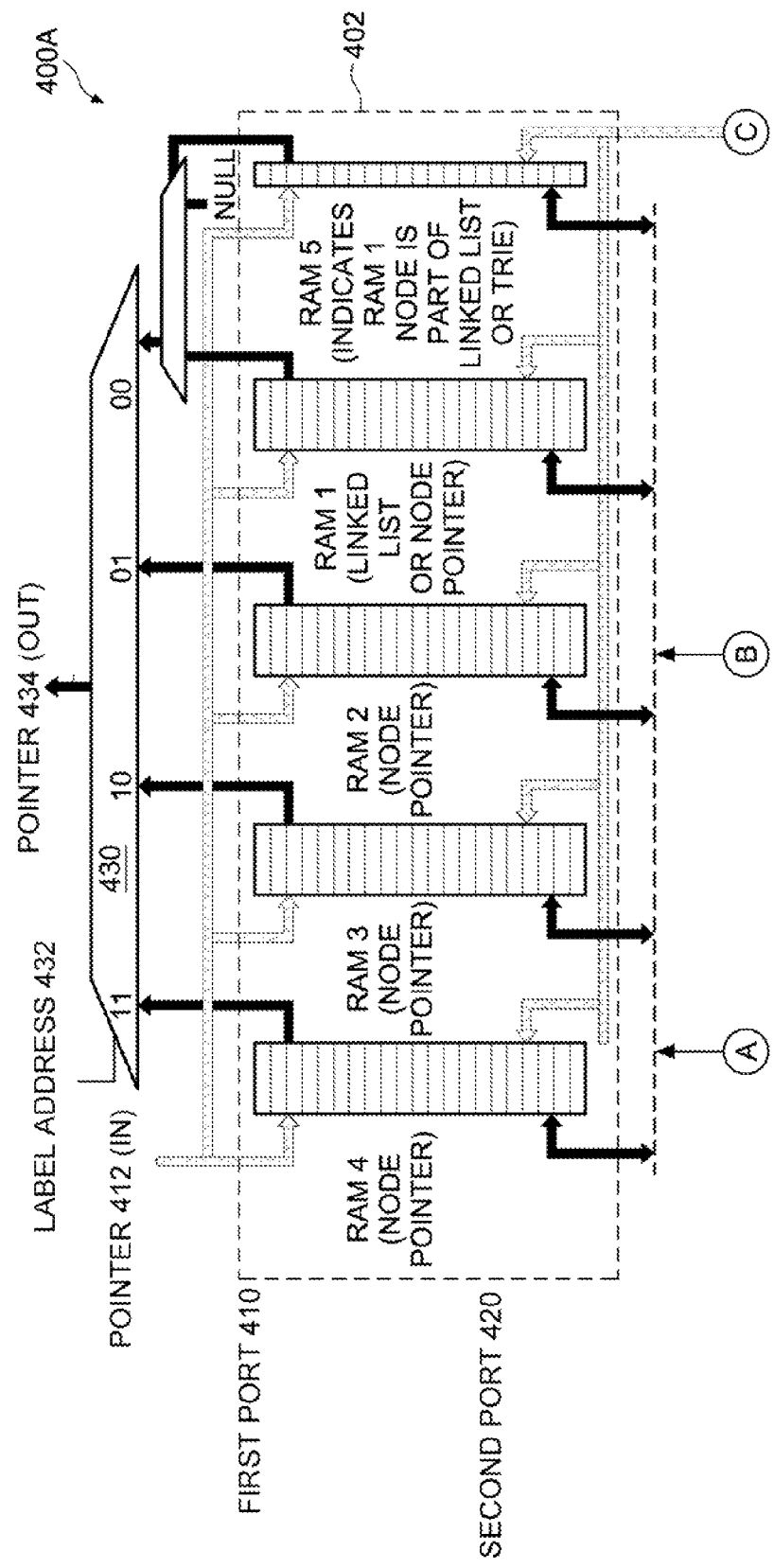
FIG. 4A illustrates an overview of an internal architecture of each of the pipeline blocks of the search engine, according to one embodiment.

FIG. 4A illustrates an overview of an internal architecture 400A of each of the pipeline blocks of the search engine 120, according to one embodiment. Particularly, FIG. 4A illustrates the dual ported memory 140 configured to perform concurrent and independent search and update operations. The dual ported memory 140 may include a first port 410 dedicated to perform address searches and a second port 420 dedicated to perform updates that may include address insert and address delete operations. The dual ported memory 140 may be reset or initialized prior to performing any search, insert, and delete operations. That is, all memory locations may be set to a null or empty value.

In an embodiment, the dual ported memory 140 may be used to store one or more ones of a LUT, (e.g., the first LUT 290, configured to have M rows and $2^{Q+1}$ columns, where each of the $2^Q$ columns has a width of K bits and 1 column has a single bit width, and where Q is an integer not greater than (N−K)). In the depicted embodiment, Q is configured to be equal to 2. The number of dual ported memories (e.g., RAMs) may be equal to 5 (e.g., $2^{2+1}$). For performing searches, an address pointer 412, (e.g., an N-bit wide address) may be received at the first port 410, and a label address 432 including the next 2 bits of (N−K) bits are received by a multiplexer 430. A pointer 434 that is indicative of results of the search is retrieved and is provided as an output. A null or an empty pointer may indicate 'no match' found.

Input and output data flowing through the second port 420 may be controlled by a memory controller 440. In an embodiment, the logic module 130 described with reference to FIG. 1 may include the memory controller 440. In the depicted embodiment, the memory controller 440 includes an insert node processing module 450 configured to perform a node/address insert operation, a delete node processing module 460 configured to perform a node/address delete operation, a node address processing module 470 configured to receive and process addresses for the node insert operation and the node delete operation, a delete validation latch 480 to validate the node delete operation of a selected node of a multibit trie, and a clock 488 configured to generate clock cycles for controlling timing of the update, which includes insert and delete operations.

The insert node processing module 450 is configured to receive a head pointer from a next pipeline block, an initialization data, and an insert label input (next 2 bits) and provide an insert pointer output to control the second port 420. The delete node processing module 460 is configured to receive a delete label input (next 2 bits), a final delete input, and provide as output a delete pointer output and a delete node in processing. The node address processing module 470 is configured to receive an initialization address, a head pointer, a delete address in, and insert pointer in to update the status of the last column having a width of 1 bit that may be used to indicate if a node is a part of a linked list or part of a multibit trie. The delete validation latch 480 (or simply the latch 480) is configured to receive an input from a next basic search unit (BSU), the delete node in processing, and the insert pointer in to validate the node delete operation of a selected node of a multibit trie by providing a delete intermediate out. Additional details of a time division multiplexing (TDM) block 490 used to avoid memory access conflicts between the insert and delete operations, and within multiple delete operations are described with reference to FIG. 4B. The clock 488 may be configured to generate multiple clock cycles in a time slot.

Figure 4B:
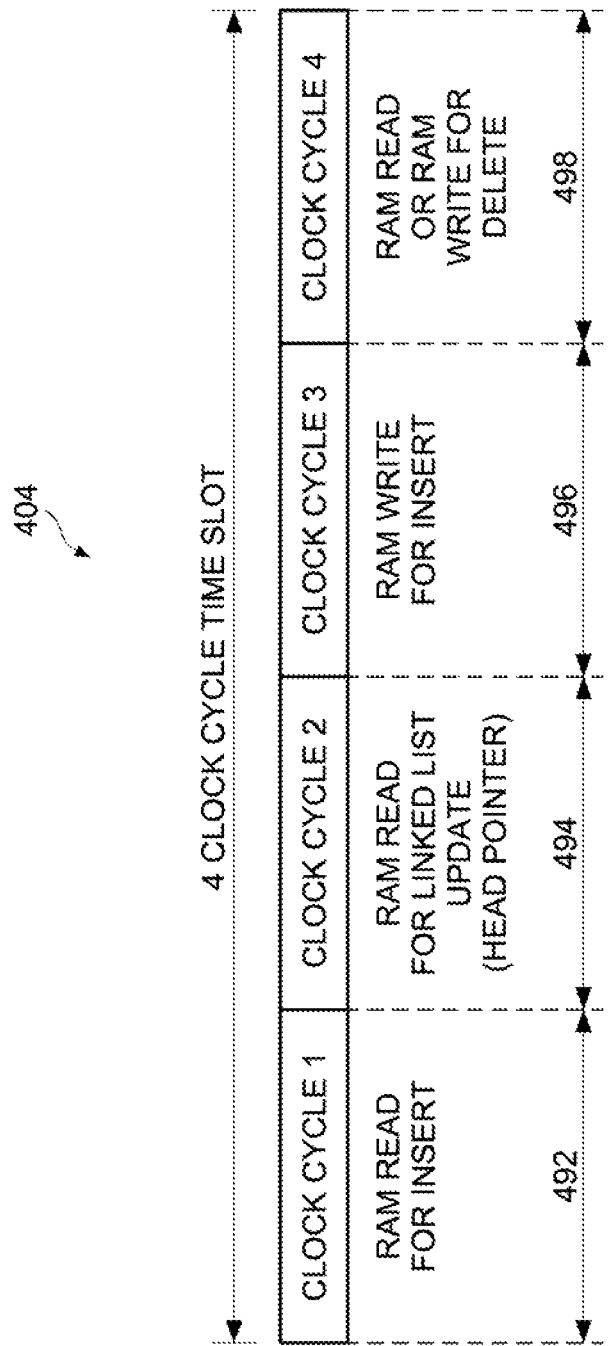
FIG. 4B is a timing diagram illustrating clock cycles generated by a clock described with reference to FIG. 4A to perform insert and delete operations, according to one embodiment.

FIG. 4B is a timing diagram 404 illustrating clock cycles generated by the clock 488 described with reference to FIG. 4A to perform insert and delete operations, according to one embodiment. In the depicted embodiment, the clock 488 generates the TDM block 490 that includes four clock cycles in a time slot. It is understood that, the number of clock cycles per time slot may vary with each application. In a first clock cycle 492, the dual ported memory 140 is read for an insert operation. In a second clock cycle 494, the dual ported memory 140 is read for linked list update (head pointer). In a third clock cycle 496, the dual ported memory 140 is written to for the insert operation. In a fourth clock cycle 498, the dual ported memory 140 is read or written to for the delete operation. Thus, an insert operation is allocated a time slot every four clock cycles and a new insert operation may be started every time slot or every four clock cycles.

A delete operation is allocated a time slot every four clock cycles and a new delete operation is started after previous delete operation has been completed. Since the technique effectively multiplexes both inserts and deletes to access the second port 420, the search engine 120 provides an insert throughput of one insert every four clock cycles and a delete throughput of $4*((N-\log_2 M)/2+1)$ cycles compared to $O(N/2)$ cycles for insert and $O(2*(N/2))$ cycles for delete for a 2-bit trie based structure.

Referring to FIGS. 4A and 4B, RAM 1 may be initialized as a linked list, address location 1 may be written with data 2, address location 2 may be written with data 3, address M−1 may be written with data M and so on. The insert node processing module 450 may ensure that the initialization data and address are multiplexed to the RAM 1 address and write ports at the proper time slot, e.g., a third clock cycle time slot 496.

The insert node processing 450 and the node address processing module 470 may enable reading nodes at pre-defined time slots, e.g., a first clock cycle time slot 492, to check for existence of pointers during an insert operation. The insert node processing module 450 may use the head pointer from a next BSU as pointer to be updated into the memory selected by Q bits of the insert label at the appropriate time, e.g., a third clock cycle time slot 496, when the insert search performed in the first clock cycle time slot 492, results in no match.

When a previous pipeline block request for a head pointer to create a new node is received, a current head pointer may used as an address in RAM1 to read a next head pointer in the appropriate time slot, (e.g., a second clock cycle time slot 494).

The delete operation may be performed in two stages, in a first stage, the LUTs 290-296 may be traversed to identify the nodes that are to be deleted. This operation may be enabled by delete node processing module 460 and the node address processing module 470 at the appropriate time slot, (e.g., a fourth clock cycle time slot 498), the traversed nodes may also be stored in the delete validation latch 480 and continuously compared with nodes being inserted. A delete intermediate out flag may be kept active as long the node in the delete validation latch 480 is not getting inserted. Each one of the LUTss 290-296 generates the delete intermediate out flag that is processed by a delete validation logic to generate individual delete flag signal for all the pipeline blocks in a second stage of the delete operation. Additional details of the delete validation logic associated with the delete operation are described with reference to FIG. 5. The delete validation logic may ensure that if there are any new nodes created using the nodes qualified for delete, the delete flag to the individual pipeline blocks below that level is not generated. The delete flag from the delete validation logic may be used by individual pipeline logic to erase the node in the appropriate time slot, (e.g., the fourth clock cycle time slot 498). The fourth clock cycle time slot 498 configured for the delete operation may be shared across the two stages explained above, as both the stages may not be concurrent within a pipeline block.

The speed of performing updates (insert and delete operations) is improved using the dual ported memory 140, time division multiplexed access and intermediate latching techniques. This technique enables the updates to be made independent of the search, making them significantly faster and pipelined. A 2-bit trie may take $O(N/2)$ cycles for insert and $O(2*(N/2))$ cycles for delete, whereas the improved pipelined technique reduces the cycles for insert to $O(1)$ and deletes to $O((N-\log_2 M)/2+1)$ cycles. Since the improved technique effectively multiplexes both inserts and deletes to access the shared memory port, the insert throughput is every four clock cycles and delete throughput is $4*((N-\log_2 M)/2+1)$ cycles. The improved technique is compact enough for hardware implementation and therefore may not require any additional software stack/drivers or processor for its functioning.

Figure 5:
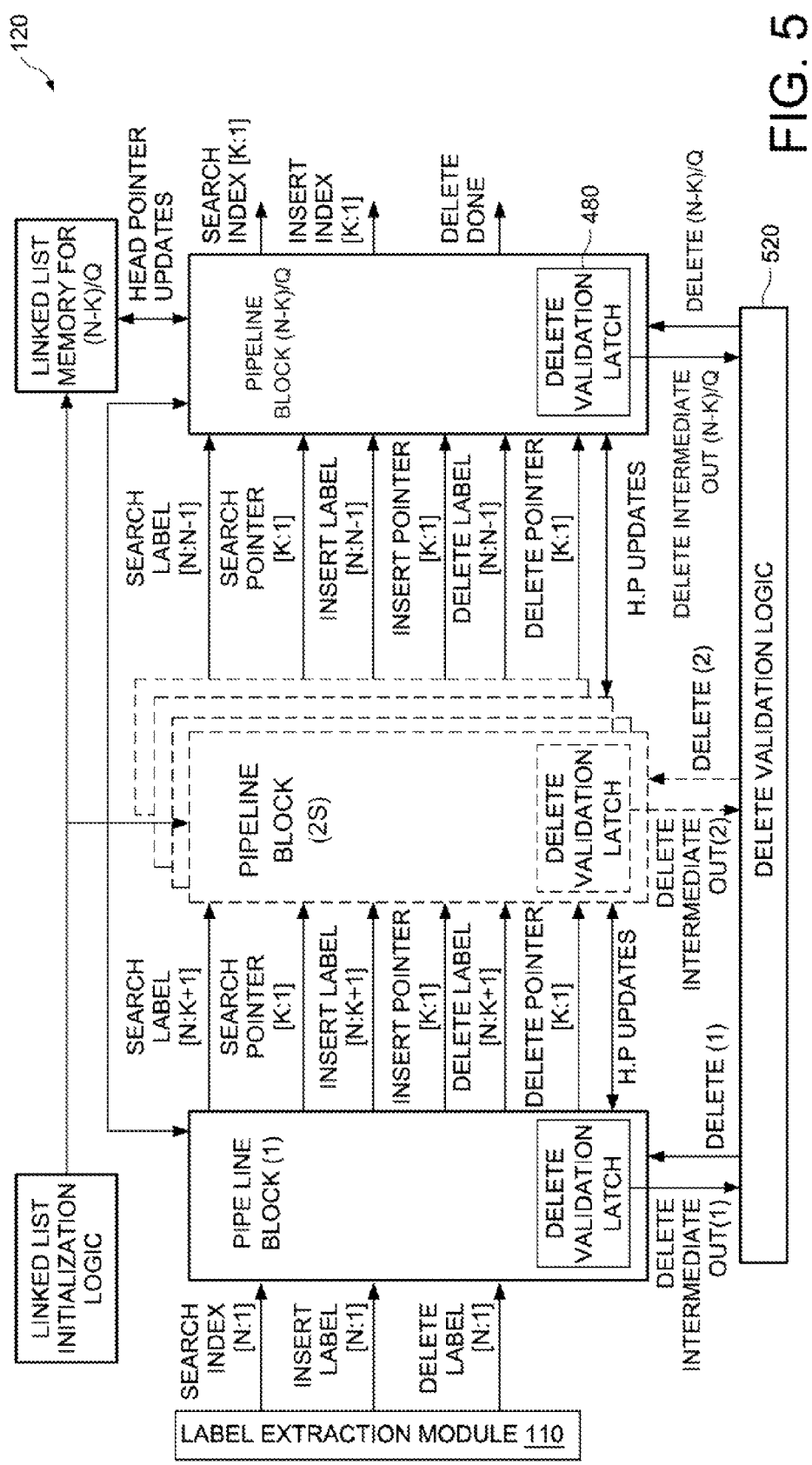
FIG. 5 illustrates an overview of pipelining performed by the search engine, according to one embodiment.

FIG. 5 illustrates an overview of pipelining performed by the search engine 120, according to one embodiment. In the depicted embodiment, the search engine 120 includes multiple LUTs (or pipeline blocks), one LUT corresponding to each one of the (N−K)/Q levels (or (N−K)/2 levels if Q=2). A delete validation logic module 520 is coupled to the delete validation latch 480 corresponding to each pipeline block to receive the delete intermediate out flag (provided by the delete validation latch 480) and provide a delete input to the delete node processing module 460 corresponding to each pipeline block. Each pipeline block located at a base or root level receives a search label input, an insert label input and a delete label input. Each pipeline block located at a leaf level also receives pointers corresponding to the search label input, the insert label input and the delete label input. A separate linked list memory may be provided for the leaf node because there may be no further nodes that can provide pointers, the linked list also ensures that all leaf nodes are unique for every insert made. The linked list memory for leaf level ((N−K)/2 level) is updated when the node is deleted and head pointer is updated when new node is created as part of an insert.

Each of the pipeline blocks may receive input labels from the previous pipeline block and may use the corresponding 2 bits of labels and pass on the rest of the labels to a next pipeline block as shown in FIG. 5. Appropriate pipelining may be performed for the labels in case of search, insert and delete. A new label may be provided to the next pipeline block every clock cycle for search, every four clock cycles for insert and similarly for delete search. The head pointer from the next pipeline block may be used by the current pipeline block as pointer in the new node created.

Figure 6A:
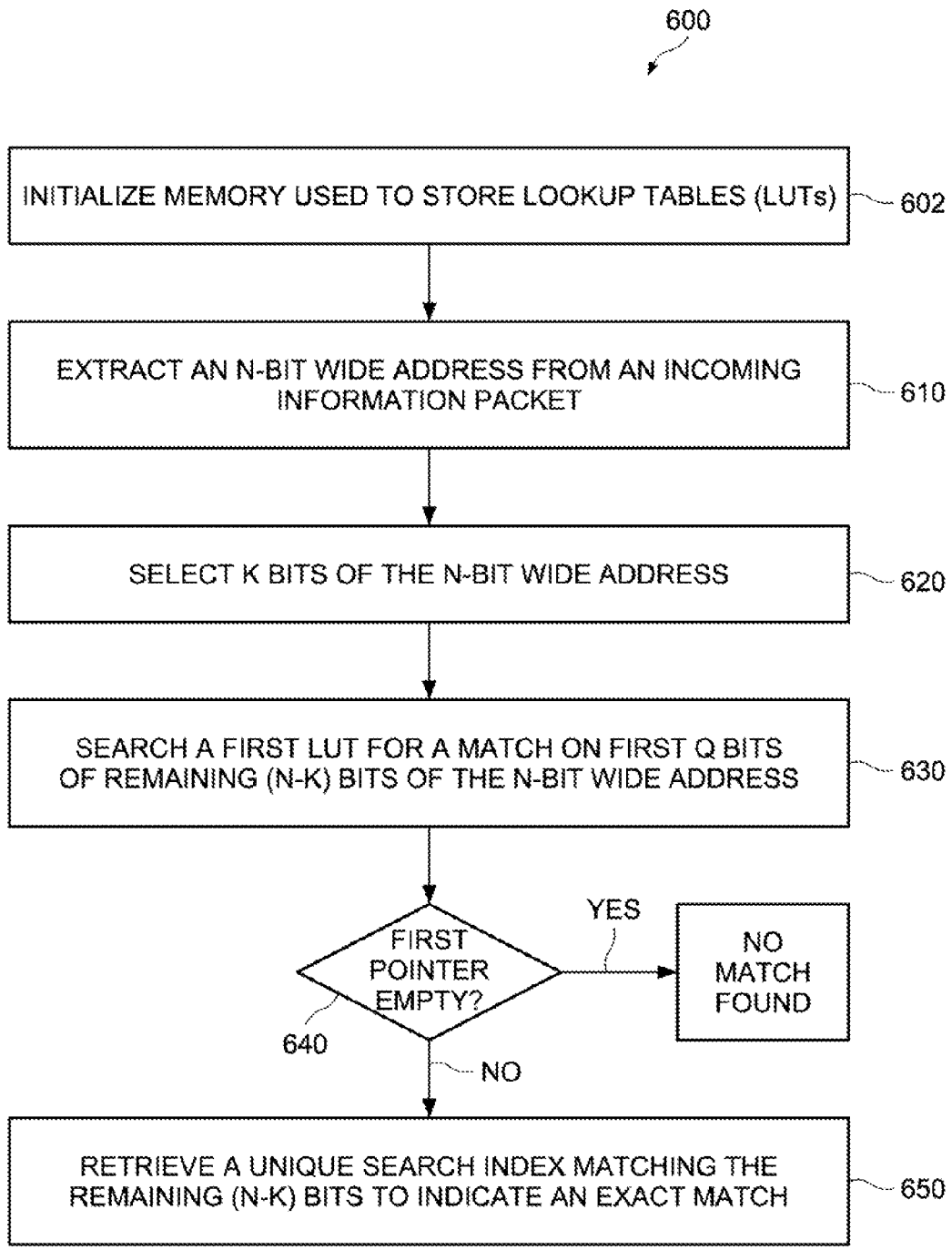
FIG. 6A is a flow chart of a method for finding an exact match for an N-bit wide address, according to one embodiment.
Figure 6B:
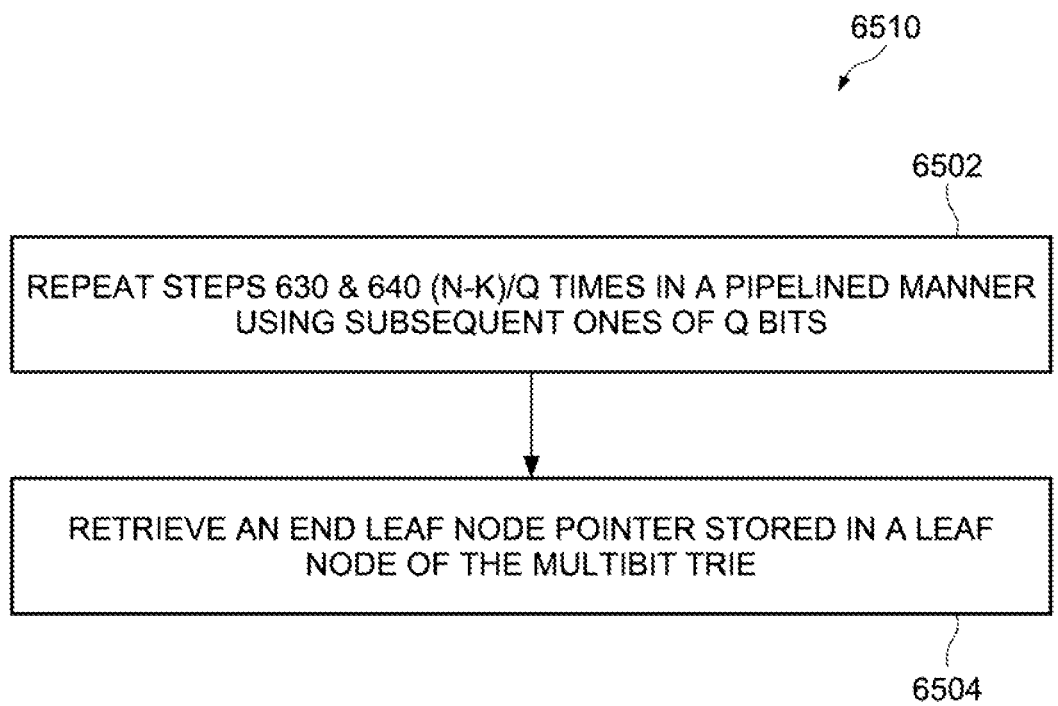
FIG. 6B is a flow chart of a method for retrieving a unique search index matching remaining (N−K) bits of an address, according to one embodiment.
Figure 7:
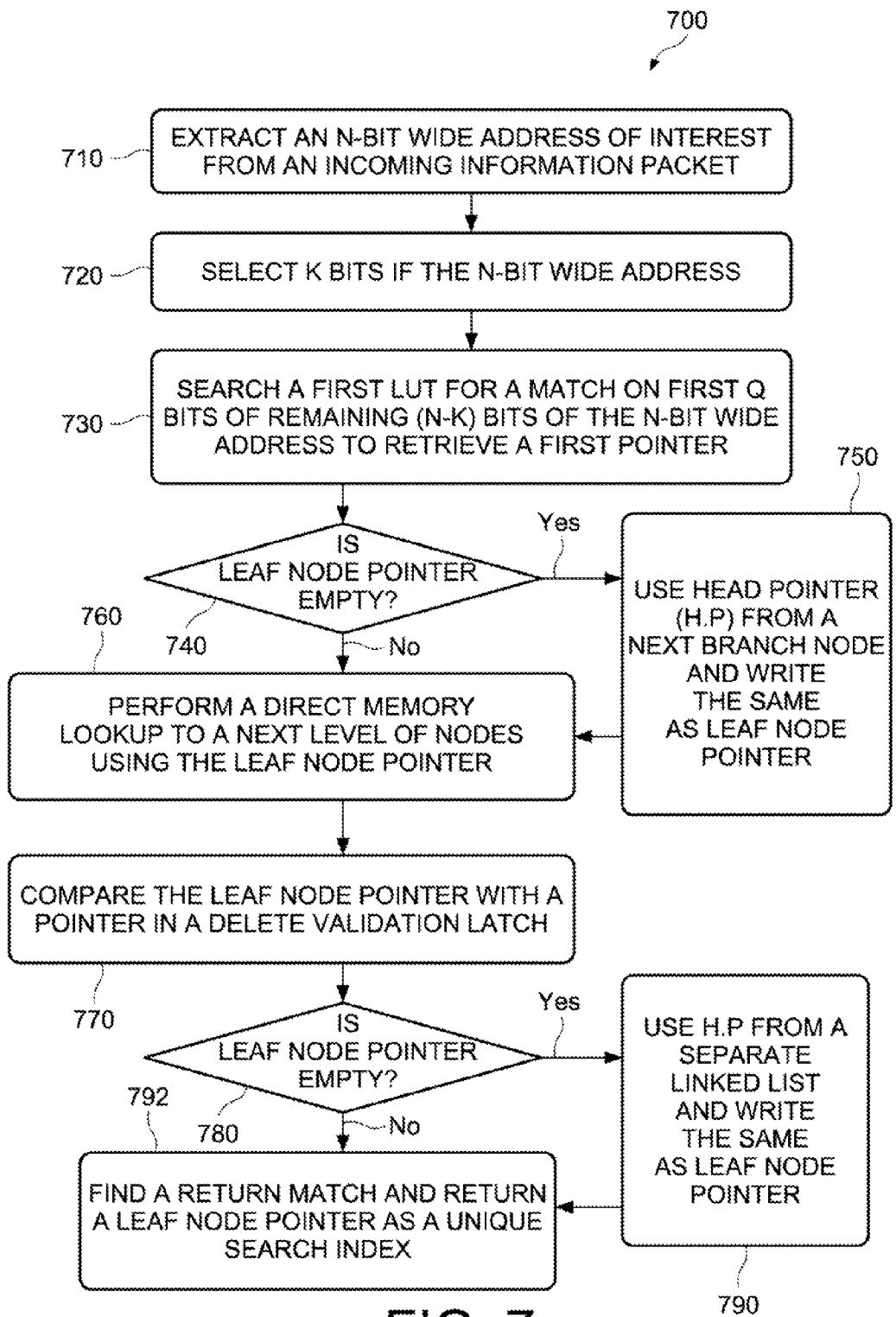
FIG. 7 is a flow chart of a method for inserting a node having an N-bit wide address in a multibit trie, according to one embodiment.
Figure 8:
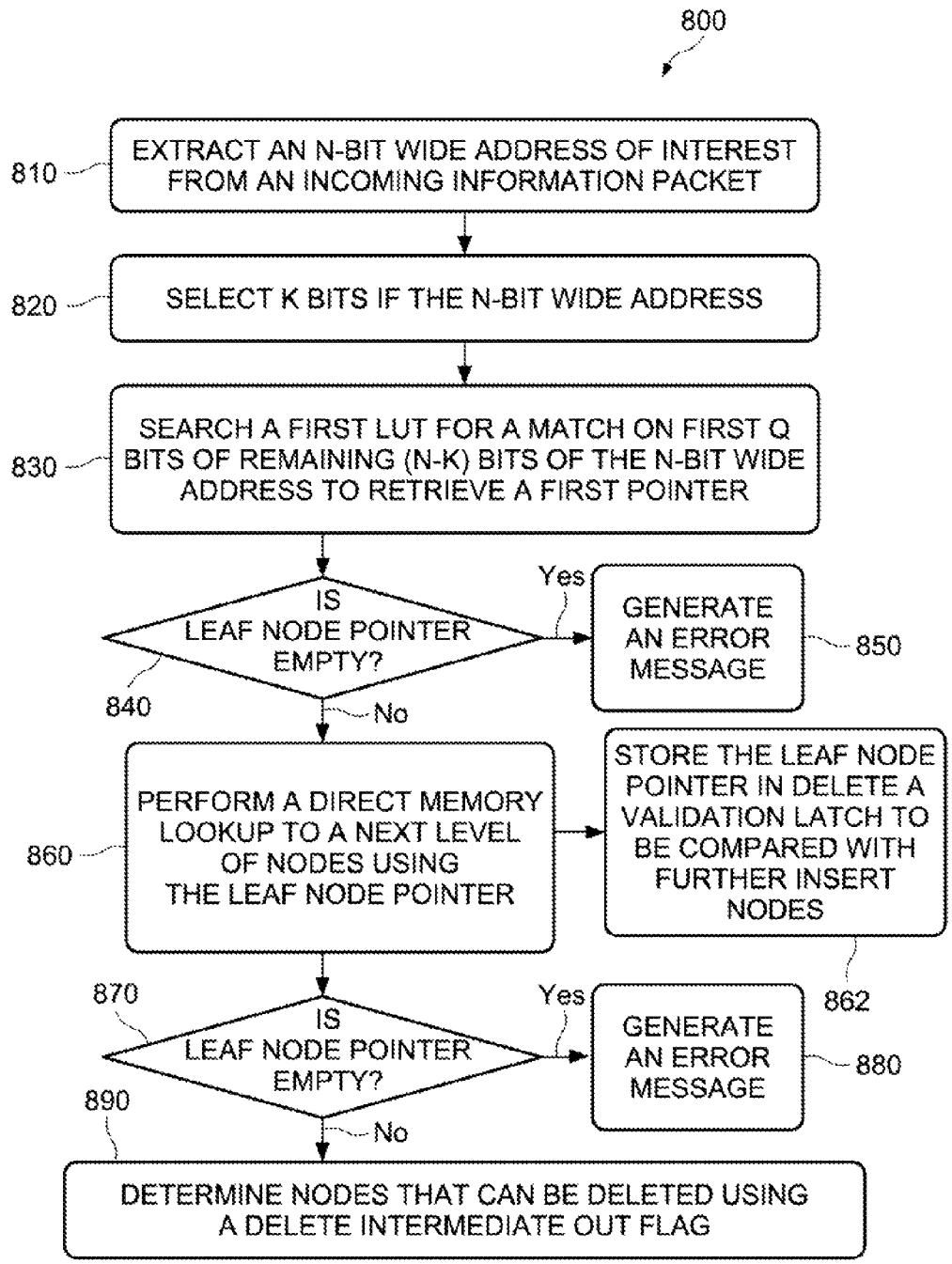
FIG. 8 is a flow chart of a method for deleting a node having an N-bit wide address in a multibit trie, according to one embodiment.

FIGS. 6, 7 and 8 are illustrative flow charts of methods for searching, inserting, and deleting network address labels stored in a LUT.

Particularly, FIG. 6A is a flow chart of a method 600 for finding an exact match for an N-bit wide address, according to one embodiment. In an embodiment, the method 600 is used for finding an exact search using the communication system 100 described with reference to FIG. 1. As described herein, an exact match for a particular address results in finding a single, unique database record. Other types of non-exact searches, e.g., longest prefix search, may result in finding more than one database records.

At step 610, an N-bit wide address of interest, e.g., a destination address is extracted from an incoming information packet. At step 620, K bits of the N-bit wide address are selected and used as a key to directly lookup a base node of a multibit trie. The base node is included in a first LUT, and the first LUT is configured to store pointers to leaf nodes of the multibit trie. K is dependent on a number of entries in the first LUT. At step 630, the first LUT is searched for a match on first Q bits of remaining (N−K) bits of the N-bit wide address to retrieve a first pointer pointing to a first level leaf node of the multibit trie. Q is an integer not greater than (N−K). For example, in a first iteration, K+1 and K+2 bits of a packet label may be used to determine which leaf node pointer memory needs to be looked up. There are four match possibilities "00", "01", "10" and "11" for the K+1 and K+2 bits.

At step 640, a determination is made whether the first pointer is empty. If it is determined that the first pointer is not empty, then step 650 is performed. At step 650, a unique search index matching the remaining (N−K) bits is retrieved to indicate the exact match. If it is determined that the first pointer is empty, it is declared as no match found.

It is understood that, various steps described above may be added, omitted, combined, altered, or performed in different orders. For example, step 602 may be added before the step 610 to initialize memory used for storing the LUT. As another example, step 650 may be divided into sub-steps 6502 and 6504, illustrated in FIG. 6B. Particularly, FIG. 6B is a flow chart of a method 6510 for retrieving the unique search index matching the remaining (N−K) bits, according to one embodiment. At step 6502, the searching step 630 and the determining step 640 are repeated (N−K)/Q times in a pipelined manner using subsequent ones of Q bits, e.g., (K+4, K+3) up to (N, N−1) bits, for performing each iteration. The searching step 630 is performed in a LUT corresponding to each one of the leaf nodes addressed by a pointer retrieved from a previous iteration. At step 6504, an end leaf node pointer stored in a leaf node of the multibit trie is retrieved. The end leaf pointer corresponding to last ones of Q bits is retrieved as the unique search index indicative of the exact match.

FIG. 7 is a flow chart of a method 700 for inserting a node having an N-bit wide address in a multibit trie, according to one embodiment. In an embodiment, the method 700 is used for inserting a new network address label in a LUT using the communication system 100 described with reference to FIG. 1. In an embodiment, the LUT is stored in a dual ported memory. The insert operation may be performed in response to obtaining a 'no match found' for the new network address label during a previous search operation.

At step 710, an N-bit wide address of interest, e.g., a new network address label is extracted from an incoming information packet received at an ingress port at an insert time slot. At step 720, K bits of the N-bit wide address are selected and used as a key to directly lookup a base node of a multibit trie. The base node is included in a first LUT stored in the dual ported memory and the first LUT is configured to store pointers to leaf nodes of the multibit trie. K is dependent on a number of entries in the first LUT. The direct lookup may be performed using the dedicated port of the dual ported memory for performing insert and delete operations.

At step 730, the first LUT is searched for a match on first Q bits of remaining (N−K) bits of the N-bit wide address to retrieve a first pointer pointing to a first level leaf node of the multibit trie. Q is an integer not greater than (N−K). For example, in a first iteration, K+1 and K+2 bits of the packet label may be used to determine which leaf node pointer memory needs to be looked up. There are four match possibilities "00", "01", "10" and "11" for the K+1 and K+2 bits.

At step 740, a determination is made whether the leaf node pointer is empty. If it is determined that the leaf node pointer is empty, then step 750 is performed. At step 750, a head pointer (HP) from a next branch node is used and the same is written as the leaf node pointer. Then, the leaf node pointer is used as the HP and a request is sent to update the HP on the next branch node. Control is then transferred to step 760.

If it is determined in step 740 that the leaf node pointer is not empty, then step 760 is performed. At step 760, the leaf node pointer is used to perform a direct memory lookup to the next level of nodes, e.g., by repeating steps 730, 740, 750 (N−K)/Q times in a pipelined manner using subsequent ones of Q bits, e.g., (K+4, K+3) up to (N, N−1) bits, for performing each iteration. If HP request is received from previous leaf node, the linked list is traversed and HP is updated.

At step 770, the leaf node pointer is compared with a pointer in a delete validation latch and if a match is found, then an intermediate delete output is cleared. At step 780, a determination is made whether the leaf node pointer is empty. If it is determined that the leaf node pointer is empty, then step 790 is performed. At step 790, the HP from a separate linked list is used and the same is written as the leaf node pointer. Then, the leaf node pointer is used as the HP and a request is sent for linked list to update the HP. Control is then transferred to step 792.

If it is determined that the leaf node pointer is not empty, then step 792 is performed. At step 792, a return match is found and a leaf node pointer is returned as a unique search index indicative of the completion of the insert operation. It is understood, that various steps described above may be added, omitted, combined, altered, or performed in different orders.

FIG. 8 is a flow chart of a method 800 for deleting a node having an N-bit wide address in a multibit trie, according to one embodiment. In an embodiment, the method 800 is used for deleting an existing network address label in a LUT using the communication system 100 described with reference to FIG. 1. In an embodiment, the LUT is stored in a dual ported memory.

At step 810, an N-bit wide address of interest, e.g., a delete address is extracted from an incoming information packet received at an ingress port at a delete time slot. As described earlier, a new delete operation starts after a previous delete operation is completed. At step 820, K bits of the N-bit wide address are selected and used as a key to directly lookup a base node of a multibit trie. The base node is included in a first LUT stored in the dual ported memory and the first LUT is configured to store pointers to leaf nodes of the multibit trie. K is dependent on a number of entries in the first LUT. The direct lookup may be performed using the dedicated port of the dual ported memory for performing insert and delete operations.

At step 830, the first LUT is searched for a match on first Q bits of remaining (N−K) bits of the N-bit wide address to retrieve a first pointer pointing to a first level leaf node of the multibit trie. Q is an integer not greater than (N−K). For example, in a first iteration, K+1 and K+2 bits of the packet label may be used to determine which leaf node pointer memory needs to be looked up. There are four match possibilities "00", "01", "10" and "11" for the K+1 and K+2 bits. At step 840, a determination is made whether the leaf node pointer is empty.

If it is determined that the leaf node pointer is empty, then step 850 is performed. At step 850, an error message is generated indicating that the delete address is non-existent or the pointer database may be corrupt. If it is determined that the leaf node pointer is not empty, then step 860 is performed. At step 860, the leaf node pointer is used to perform a direct memory lookup to the next level of nodes, e.g., by repeating steps 830, 840, 850 (N−K)/Q times in a pipelined manner using subsequent ones of Q bits, e.g., (K+4, K+3) up to (N, N−1) bits, for performing each iteration. If HP update request is received from previous leaf node, the linked list is traversed and HP is updated. At step 862, the leaf node pointer is stored in a delete validation latch for comparison with further insert nodes and a node clear signal is updated in response to the comparison.

At step 870, a determination is made whether the leaf node pointer is empty. If it is determined that the leaf node pointer is empty, then step 880 is performed. At step 880, an error message is generated indicating that the delete address is non-existent or the pointer database may be corrupt. If it is determined that the leaf node pointer is not empty, then step 890 is performed. At step 890, nodes to be deleted are determined using a delete intermediate out flag from all the (N−K)/Q pipeline block's delete validation logic. These nodes are cleared and returned to free pointer linked list. It is understood, that various steps described above may be added, omitted, combined, altered, or performed in different orders.

Figure 9:
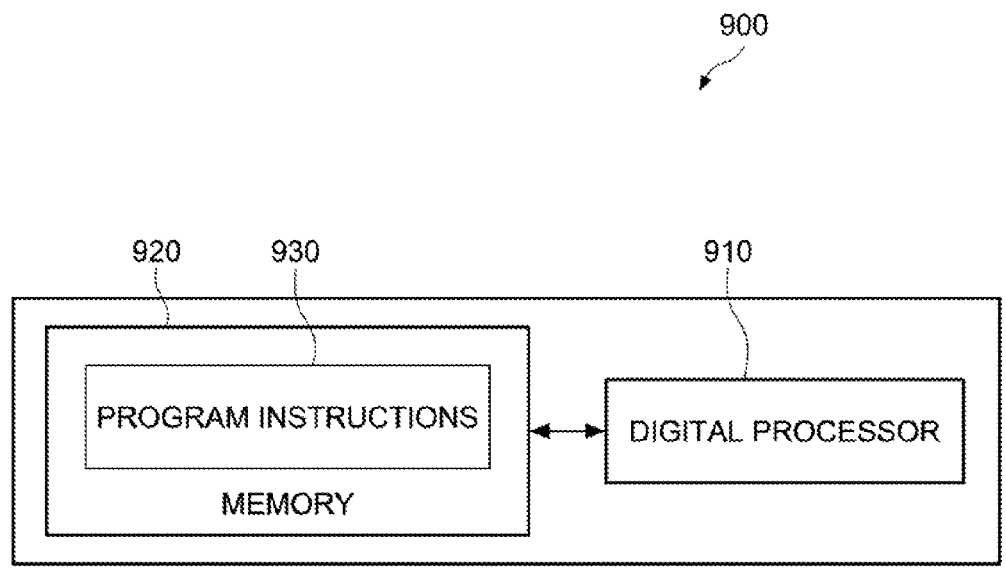
FIG. 9 illustrates a block diagram of a computer system, according to one embodiment.

FIG. 9 illustrates a block diagram of a computer system 900, according to one embodiment. The computer system 900 includes a digital processor 910 coupled to memory 920. It is understood that more than one processor may be deployed to match desired computing load or desired performance. The memory 920 is operable to store program instructions 930 that are executable by the digital processor 910 to perform one or more functions. It should be understood that the term "computer system" is intended to encompass any device having a processor that is capable of executing program instructions from a memory medium. It is understood that the digital processor 910 may be implemented as any electronic device such as controller, microcontroller, central processing unit, microprocessor, digital signal processor, state machine, programmable logic array, field programmable device, sequential and/or combinatorial logic device, and others depending on the application.

The computer system 900 may take many forms, including but not limited to a workstation, server, network computer, quantum computer, optical computer, bio-computer, Internet appliance, set top box, gaming device, mobile device, pager, tablet computer, and the like. In a particular embodiment, the various functions, steps, processes, methods 600, 6510, 700, 800, and operations described herein may be implemented using the computer system 900. For example, the communication system 100 and any components thereof, e.g., the processing engine 120, may be implemented using one or more ones of the computer system 900. In an embodiment, the communication system 100 and any components thereof may be implemented as hardware in the form of an application specific integrated circuit (ASIC) chip or a field programmable gate array (FPGA) chip.

The various functions, steps, processes, methods 600, 6510, 700, 800, and operations performed or executed by the computer system 900 can be implemented as hardware modules or as the program instructions 930 (also referred to as software or simply programs) that are executable by the digital processor 910 and various types of computer processors, controllers, microcontrollers, central processing units, microprocessors, digital signal processors, state machines, programmable logic arrays, field programmable devices, sequential and/or combinatorial logic devices, processing engines, and others. In an exemplary, non-depicted embodiment, the computer system 900 may be networked (using wired or wireless networks) with other computer systems.

In various embodiments, the program instructions 930 may be implemented in various ways, including procedure-based techniques, component-based techniques, object-oriented techniques, rule-based techniques, among others. The program instructions 930 can be stored on the memory 920 or any computer-readable medium for use by or in connection with any computer-related system or method. A non-transitory, computer-readable storage medium is an electronic, magnetic, optical, or other physical device or means that can contain or store computer program logic instructions for use by or in connection with a computer-related system, method, process, or procedure. Programs can be embodied in a computer-readable storage medium for use by or in connection with an instruction execution system, device, component, element, or apparatus, such as a system based on a computer or processor, or other system that can fetch instructions from an instruction memory or storage of any appropriate type. A non-transitory, computer-readable storage medium can be any structure, device, component, product, or other means that can store, communicate, propagate, or transport the program for use by or in connection with the instruction execution system, apparatus, or device.

The communication system 100 may be configured to improve performance by deploying various techniques to achieve high search throughput, high update throughput, and reduced memory size without sacrificing power efficiency and predictability. Specifically, improvement in search throughput may be achieved by: 1) Splitting the search into two steps, a direct look-up followed by 2-bit pointer based trie traversal instead of a complete trie traversal using all bits. Assuming that the number of entries required is M and N is the width of the destination address, the first K bits of the destination address may be used for direct lookup, where K=$\log_2$M bits. This technique directly reduces the search and updates latency for the K/2 tries and also reduces a significant amount of internal memory needed to build K/2 trie levels. 2) Each trie level may be organized to have four pointer static random access memory (SRAM) of width K and depth 2K, each representing the four possible leaf nodes—"00", "01", "10" and "11". These pointers have a separate memory manager using the linked list. This technique assists pipelining and helps in achieving 1 clock cycle throughput for search. The 1 clock cycle latency is due to the memory latency for read operation. One of the pointer memory referenced above may also used for maintaining a linked list when the node is not created and to host the leaf pointer when the node is created. This may be possible since at any point in time, a pointer can be either part of the linked list or it may be used as a node in the trie structure. This may be implemented by using an extra bit to indicate if the node is part of the linked list or leaf pointer. The use of the single bit reduces additional memory which would have been needed to implement linked list, which is of width M×K per trie level, e.g., resulting in total RAM bits saved of M×K×(N−K)/2 bits. Predictability or deterministic response of the communication system 100 may be improved by avoiding collisions with entries (e.g., by using dedicated clock cycles) and avoiding data dependent solutions such as hash-based search algorithms.

Improvement in update performance may be obtained by: 1) Deploying a dual port SRAM for the insert and delete (updates) to increase speed and by using time division multiplexing of insert and delete operation over four clock cycle period. This technique provides a higher update throughput. 2) Deploying an efficient delete operation. A significant, time consuming operation in any trie based algorithm is the delete operation since it involves tracing the node up to the leaf and back tracking to check dependency. The complexity may be further increased by the pipeline, because there are (N−K)/2 or more inserts occurring while a delete operation may be in progress. There may be a possibility that a node that is being deleted down the pipeline may be used by an insert in the pipeline. In the improved technique, each pipeline block holds the leaf node pointer qualified for delete (node that do not have more than one dependent leafs in the next node) in a latch and the latched node is continuously looking for inserts happening to the same node till the delete operation reaches the final leaf node. If the insert node matches with the delete node, a delete clear signal (delete intermediate flag) is generated and latched in each node segment and brought out of each pipeline block. On reaching the final leaf node, the delete clear signal (delete intermediate flag) is used to identify the nodes that can be deleted and final delete signal is generated to individual pipeline block and deleted nodes are returned to the free pointer linked list at each pipeline block within a single clock cycle, this ensures that a delete operation would not need back tracking and also new nodes created during the delete traversals are not accidentally deleted. This technique reduces considerable amount of clock cycles for each delete operation and keeps the inserts pipelined. In addition, since the approach is pointer based, the overall logic is reduced to few comparisons at every pipeline stage saving power.

In an embodiment, the communication system 100 may be implemented as a pure hardware solution to achieve wire-speed throughput by avoiding use of any software or stack that may be executed to manage the lookup database. This technique provides a significant saving in terms of silicon area and cost. In addition, since the approach does not utilize any memory cell level optimization techniques, it is not technology dependent and can be implemented in both ASIC and FPGA technologies. It is understood that the communication system 100 may be implemented as a combination of hardware and software in applications that may not need wire-speed type performance.

The various devices, modules, engines, ports, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., ASIC). Although the present embodiments have been described with reference to specific example embodiments, it will be evident that various modifications and changes may be made to these embodiments without departing from the broader spirit and scope of the various embodiments. For example, the present embodiments are discussed in terms of a wire-speed address lookup application. However, the present embodiments can be applied to any communication systems for processing signals independent of their transmission rate. In the claims, unless otherwise indicated the article 'a' is to refer to 'one or more than one'.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein but is to be accorded the widest scope consistent with the principles and features disclosed herein.

What is claimed is:

1. A system for processing packets, comprising:
  a processor, a memory comprising a plurality of lookup tables (LUTs) and programmed instructions, wherein the processor is configured to execute the programmed instructions stored in the memory comprising:
    extracting K bits from an N-bit wide address of an incoming information packet;
    using a key to identify an entry of one of the LUTs, wherein the entry includes a pointer and the key in a first iteration includes the extracted K bits and Q bits of the (N−K) bits not extracted;
    determining whether the pointer is empty;
    returning an indication that no match was found, when it is determined that the pointer is empty;
    determining whether all of the (N−K) bits not extracted have been used, when it is determined that the pointer is not empty;
    returning the pointer, when it is determined that all of the (N−K) bits not extracted have been used, the returned pointer indicative of an exact match for the address; and
    repeating the using, determining, and returning steps in a pipelined manner, when it is determined that all of the (N−K) bits not extracted have not been used, wherein the key used in each subsequent iteration includes a value obtained from the pointer included in the entry identified in a previous iteration and Q bits of the (N−K) bits not extracted and not previously used.

2. The system of claim 1, wherein the Q bits are a next significant Q bits of the (N−K) bits not extracted that have not previously been used, the entry of the LUT in the first iteration corresponds to a base node of a multibit trie, and the entry of the LUT in each subsequent iteration corresponds to a leaf node of the multibit trie.

3. The system of claim 2, wherein the processor is further configured to execute programmed instructions stored in the memory further comprising deleting an existing leaf node in the multibit trie, wherein the existing leaf node corresponds to a received delete address.

4. The system of claim 3, wherein the deleting the existing leaf node occurs concurrently and independently of searching the leaf nodes after completion of a previous delete operation.

5. The system of claim 2, wherein the processor is further configured to execute programmed instructions stored in the memory further comprising inserting a new leaf node in the multibit trie, the new leaf node corresponding to a received insert address.

6. The system of claim 5, wherein inserting the new leaf node occurs concurrently and independently of searching the leaf nodes and wherein inserting the new leaf node is performed at every four clock cycles.

7. The system of claim 6, wherein a single comparison is used to find the exact match for the N-bit wide address.

8. A method for processing packets, comprising:
   extracting K bits from an N-bit wide address of an incoming information packet;
   using a key to identify an entry of a lookup table (LUT), wherein the entry includes a pointer and the key in a first iteration includes the extracted K bits and Q bits of the (N−K)(N−K) bits not extracted;
   determining whether the pointer is empty;
   returning an indication that no match was found, when it is determined that the pointer is empty;
   determining whether all of the (N−K)(N−K) bits not extracted have been used, when it is determined that the pointer is not empty;
   returning the pointer, when it is determined that all of the (N−K) bits not extracted have been used, the returned pointer indicative of an exact match for the address; and
   repeating the using, determining, and returning steps in a pipelined manner, when it is determined that all of the (N−K) bits not extracted have not been used, wherein the key used in each subsequent iteration includes a value obtained from the pointer included in the entry identified in a previous iteration and Q bits of the (N−K) bits not extracted and not previously used.

9. The method of claim 8, wherein the Q bits are a next significant Q bits of the (N−K) bits not extracted that have not previously been used, the entry of the LUT in the first iteration corresponds to a base node of a multibit trie, and the entry of the LUT in each subsequent iteration corresponds to a leaf node of the multibit trie.

10. The method of claim 9, further comprising deleting an existing leaf node in the multibit trie, wherein the existing leaf node corresponds to a received delete address.

11. The method of claim 10, wherein deleting the existing leaf node occurs concurrently and independently of searching the leaf nodes after completion of a previous delete operation.

12. The method of claim 9, further comprising inserting a new leaf node in the multibit trie, the new leaf node corresponding to a received insert address.

13. The method of claim 12, wherein inserting the new leaf node occurs concurrently and independently of searching the leaf nodes and wherein inserting the new leaf node is performed at every four clock cycles.

14. The method of claim 8, wherein a single comparison is used to find the exact match for the N-bit wide address.

15. A non-transitory computer-readable storage medium having instructions for processing packets, the instructions when executed by a computer, cause the computer to perform steps comprising:
   extracting K bits from an N-bit wide address of an incoming information packet;
   using a key to identify an entry of a lookup table (LUT), wherein the entry includes a pointer and the key in a first iteration includes the extracted K bits and Q bits of the (N−K) bits not extracted;
   determining whether the pointer is empty;
   returning an indication that no match was found, when it is determined that the pointer is empty;
   determining whether all of the (N−K) bits not extracted have been used, when it is determined that the pointer is not empty;
   returning the pointer, when it is determined that all of the (N−K) bits not extracted have been used, the returned pointer indicative of an exact match for the address; and
   repeating the using, determining, and returning steps in a pipelined manner, when it is determined that all of the (N−K) bits not extracted have not been used, wherein the key used in each subsequent iteration includes a value obtained from the pointer included in the entry identified in a previous iteration and Q bits of the (N−K) bits not extracted and not previously used.

16. The non-transitory computer-readable storage medium of claim 15, wherein the Q bits are a next significant Q bits of the (N−K) bits not extracted that have not previously been used, the entry of the LUT in the first iteration corresponds to a base node of a multibit trie, and the entry of the LUT in each subsequent iteration corresponds to a leaf node of the multibit trie.

17. The non-transitory computer-readable storage medium of claim 16, wherein the instructions when executed by the computer, cause the computer to perform steps further comprising deleting an existing leaf node in the multibit trie, wherein the existing leaf node corresponds to a received delete address.

18. The non-transitory computer-readable storage medium of claim 17, wherein deleting the existing leaf node occurs concurrently and independently of searching the leaf nodes after completion of a previous delete operation.

19. The non-transitory computer-readable storage medium of claim 16, wherein the instructions when executed by the computer, cause the computer to perform steps further comprising inserting a new leaf node in the multibit trie, the new leaf node corresponding to a received insert address.

20. The non-transitory computer-readable storage medium of claim 19, wherein inserting the new leaf node occurs concurrently and independently of searching the leaf nodes and wherein inserting the new leaf node is performed at every four clock cycles.

21. The non-transitory computer-readable storage medium of claim 15, wherein a single comparison is used to find the exact match for the N-bit wide address.

\* \* \* \* \*